United States Patent
Yokobayashi et al.

(10) Patent No.: US 10,795,250 B2
(45) Date of Patent: Oct. 6, 2020

(54) LIGHTING APPARATUS AND LIGHTING TOOL FOR VEHICLE

(71) Applicant: STANLEY ELECTRIC CO., LTD., Meguro-ku, Tokyo (JP)

(72) Inventors: Yusuke Yokobayashi, Tokyo (JP); Masaru Kuramoto, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/267,669

(22) Filed: Feb. 5, 2019

(65) Prior Publication Data
US 2019/0250490 A1   Aug. 15, 2019

(30) Foreign Application Priority Data

Feb. 13, 2018   (JP) .................................. 2018-023235

(51) Int. Cl.
*G03B 21/20* (2006.01)
*G02B 27/09* (2006.01)
(Continued)

(52) U.S. Cl.
CPC .......... *G03B 21/204* (2013.01); *F21S 41/176* (2018.01); *F21S 41/285* (2018.01);
(Continued)

(58) Field of Classification Search
CPC ............ G03B 21/00–64; G03B 21/204; G02B 26/008; G02B 27/01–0189; F21K 9/32; F21K 9/35; F21K 9/64; H04N 9/31–3197
See application file for complete search history.

(56) References Cited

U.S. PATENT DOCUMENTS 9,513,539 B2    12/2016  Kurosaki
10,288,242 B2    5/2019  Reisinger et al.
(Continued)

FOREIGN PATENT DOCUMENTS

JP        2014130200 A    7/2014
JP         6067629 B2    1/2017
(Continued)

OTHER PUBLICATIONS

Extended European Search Report (EESR) dated Jul. 15, 2019 issued in European Application No. 19156076.2.

*Primary Examiner* — Michelle M Iacoletti
*Assistant Examiner* — Christopher A Lamb, II
(74) *Attorney, Agent, or Firm* — Holtz, Holtz & Volek PC

(57) ABSTRACT

A lighting apparatus includes a laser source configured to emit a laser beam, a homogenizer optical element that includes a light flux dividing section disposed to face the laser source, configured to divide the laser beam into a plurality of separate laser beams in a plane and make advancing directions of the plurality of separate laser beams different from each other, and a light flux superimposing section formed integrally with the light flux dividing section and superimposing the plurality of separate laser beams on each other in a common radiation region, and a fluorescent material disposed to face the homogenizer optical element, excited by the plurality of separate laser beams superimposed in the radiation region using the light flux superimposing section so as to emit fluorescence.

13 Claims, 14 Drawing Sheets

(51) Int. Cl.
*F21S 41/20* (2018.01)
*F21S 41/176* (2018.01)
*G02B 27/14* (2006.01)

(52) U.S. Cl.
CPC ..... *G02B 27/0905* (2013.01); *G02B 27/0961* (2013.01); *G02B 27/141* (2013.01); *G03B 21/208* (2013.01); *G03B 21/2066* (2013.01)

(56) References Cited

U.S. PATENT DOCUMENTS

| | | | | |
|---|---|---|---|---|
| 2004/0076203 | A1* | 4/2004 | Kaminsky | G03B 21/56 372/39 |
| 2004/0076206 | A1* | 4/2004 | Okunuki | H01S 5/16 372/43.01 |
| 2010/0053565 | A1* | 3/2010 | Mizushima | G02B 3/0006 353/38 |
| 2011/0234998 | A1 | 9/2011 | Kurosaki | |
| 2012/0075594 | A1* | 3/2012 | Tsai | G02B 27/095 353/38 |
| 2012/0106126 | A1* | 5/2012 | Nojima | G02B 26/008 362/84 |
| 2012/0249621 | A1* | 10/2012 | Miura | G02B 3/0056 345/694 |
| 2013/0162955 | A1* | 6/2013 | Okamoto | H01S 3/005 353/30 |
| 2015/0236479 | A1* | 8/2015 | Seki | H01S 5/4012 359/641 |
| 2016/0327235 | A1* | 11/2016 | Khrushchev | F21V 5/008 |
| 2018/0142840 | A1 | 5/2018 | Kurashige | |
| 2018/0363860 | A1 | 12/2018 | Kasugai et al. | |

FOREIGN PATENT DOCUMENTS

| | | |
|---|---|---|
| WO | 2016208628 A1 | 12/2016 |
| WO | 2017020054 A1 | 2/2017 |
| WO | 2017154807 A1 | 9/2017 |

\* cited by examiner

FIG. 15A
FIG. 15B
FIG. 15C
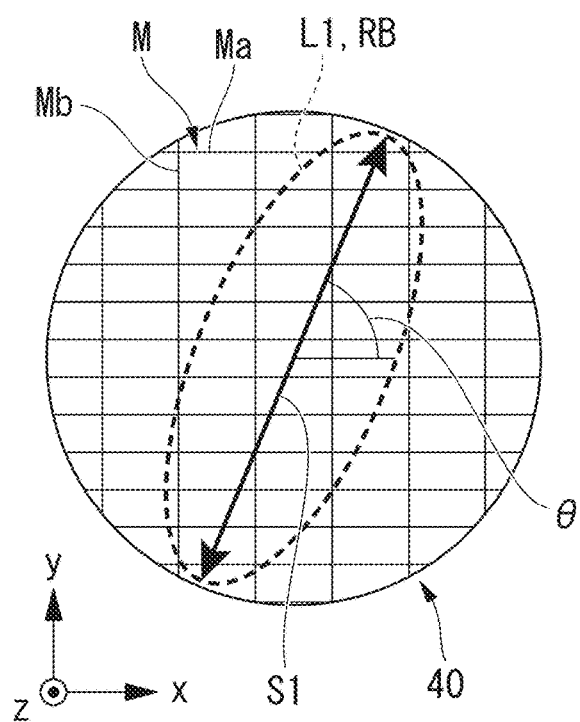
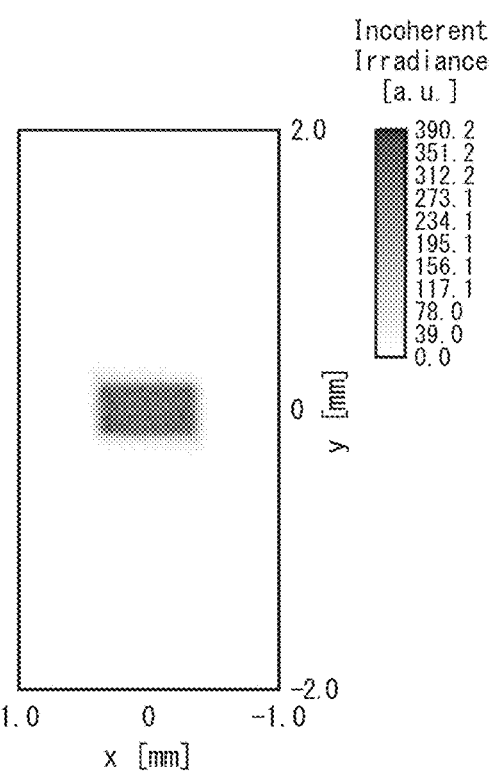
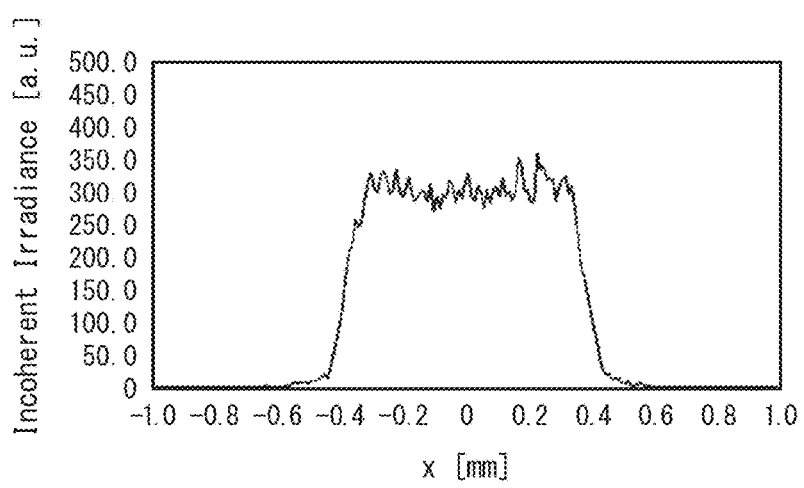

LIGHTING APPARATUS AND LIGHTING TOOL FOR VEHICLE

CROSS-REFERENCE TO RELATED APPLICATION

Priority is claimed on Japanese Patent Application No. 2018-023235, filed Feb. 13, 2018, the content of which is incorporated herein by reference.

BACKGROUND

Field of the Invention

The present invention relates to a lighting apparatus and a lighting tool for a vehicle.

Description of Related Art

In recent years, regarding a lighting tool for a vehicle, using a lighting apparatus configured to convert a laser beam emitted from a laser source into white light by radiating the laser beam to a fluorescent material, and radiating the white light to a side in front of the vehicle has been researched. In general, it is known that temperature quenching and luminance saturation of a fluorescent material are generated when the fluorescent material is irradiated with light having an intensity higher than a predetermined intensity. Based on this fact, in the above-mentioned lighting apparatus, the energy intensity distribution (hereinafter, may be simply referred to as "intensity distribution") of a laser beam is uniformized between the laser source and the fluorescent material in a direction perpendicular to an optical axis to be reshaped to a so-called top hat type. When the intensity distribution of the laser beam is reshaped to a top hat type, a peak intensity of the laser beam is minimized to a predetermined intensity or less without a large decrease in utilization efficiency of the laser beam.

For example, Japanese Patent No. 6067629 discloses a lighting apparatus including a laser element configured to emit coherent light, an optical rod configured to convert the intensity distribution of a laser beam emitted from a laser element into a top hat distribution, a lens configured to radiate a laser beam emitted from the optical rod to a conjugation plane having a conjugation relation with an emission surface, and a fluorescent material disposed on the conjugation plane, as a lighting apparatus that can be used in a lighting tool for a vehicle. In addition, Japanese Unexamined Patent Application, First Publication No. 2014-130200 discloses a micro lens array configured to uniformize an intensity distribution of light emitted from a laser source in a projection apparatus (a lighting apparatus) (becomes a so-called top hat type).

SUMMARY OF THE INVENTION

In a lighting apparatus disclosed in Japanese Patent No. 6067629, an intensity distribution of a laser beam on a radiation plane of an optical rod is reshaped to a top hat type by causing a laser beam to enter the optical rod such as a rod lens or the like and repeating reflection of the laser beam using an inner wall of the optical rod. However, whenever the laser beam is reflected by the inner wall of the optical rod, loss or absorption of the laser beam occurs. The longer the length of the optical rod, the closer the intensity distribution of the laser beam on the emission surface becomes to an ideal top hat type, but on the other hand, the amount of the laser beam absorbed by the inner wall of the optical rod increases and the efficiency decreases. In addition, since the laser beam is emitted from the emission surface of the optical rod at a large radiation angle, an incidence efficiency of the laser beam with respect to the lens or the fluorescent material behind the emission surface of the optical rod is likely to decrease. That is, in the lighting apparatus disclosed in Japanese Patent No. 6067629, there is a problem in which a utilization efficiency of the laser beam is low.

In order to minimize a decrease in utilization efficiency of the laser beam in the lighting apparatus disclosed in Japanese Patent No. 6067629, it is conceivable that a diameter of the optical rod or the lens may be increased. However, when a diameter of the optical rod or the lens is increased, the weight of the lighting apparatus greatly increases while the lighting apparatus increases in size, and it becomes difficult to apply the lighting apparatus to various apparatuses including a lighting tool for a vehicle. That is, when a decrease in utilization efficiency of the laser beam is minimized in the lighting apparatus disclosed in Japanese Patent No. 6067629, the lighting apparatus increases in size.

In addition, in order to minimize a decrease in utilization efficiency of a laser beam in the lighting apparatus disclosed in Japanese Patent No. 6067629, the optical rod, the lens and the fluorescent material need to be accurately disposed at predetermined positions on an optical axis of the laser beam emitted from the laser source. Further, the optical rod, the lens and the fluorescent material need to be accurately positioned and aligned. That is, the lighting apparatus disclosed in Japanese Patent No. 6067629 requires a precise aligning mechanism and cannot be easily manufactured as a package, and high manufacturing costs are incurred.

In addition, it is also conceivable that a micro lens array disclosed in Japanese Unexamined Patent Application, First Publication No. 2014-130200 be used to reshape an intensity distribution of a laser beam to a top hat type. In this case, the entered laser beam is divided into a plurality of beams by the micro lens array, and emitted from a plurality of micro lenses at a substantially constant radiation angle. Since plural laser beams emitted from the micro lenses are projected to a projection surface while partially superimposed, an intensity distribution of the laser beams on the projection surface is uniformized.

However, in the micro lens array disclosed in Japanese Unexamined Patent Application, First Publication No. 2014-130200, a phenomenon (tailing) in which the intensity gradually decreases from a center toward both ends of a radiation region of the laser beam after the intensity distribution is reshaped to a top hat shape in a direction perpendicular to the optical axis is generated. A proportion of a portion in which the intensity is uniformized is reduced and while so-called color irregularity or color separation is generated in the radiation region, the utilization efficiency of the laser beam is decreased as a result.

An aspect of the present invention is directed to providing a lighting apparatus capable of increasing a utilization efficiency of a laser beam and facilitating reduction in size and manufacturing costs in uniformization of an intensity distribution of the laser beam emitted from a laser source, and a lighting tool for a vehicle including the same.

According to an aspect of the present invention, there is provided a lighting apparatus including: a light source section configured to emit a laser beam; a homogenizer optical element that includes a light flux dividing section disposed to face the light source section and configured to receive a laser beam from the light source section, divide the laser beam emitted from the light source section into a plurality of separate laser beams in a plane perpendicular to an optical axis and make advancing directions of the plurality of separate laser beams different from each other, and a light flux superimposing section formed integrally with the light flux dividing section and superimposing the plurality of separate laser beams emitted from the light flux dividing section on each other in a common first radiation region, and a fluorescent material disposed to face the homogenizer optical element excited by the plurality of separate laser beams superimposed in the first radiation region using the light flux superimposing section of the homogenizer optical element so as to emit fluorescence.

In the lighting apparatus of the aspect, a light flux of the laser beam diffused and emitted from the light source section is divided into the separate laser beams having a small difference in intensity between both ends on the surface perpendicular to the optical axis of the laser beam by the light flux dividing section. Since the plurality of separate laser beams are superimposed on each other on the common first radiation region using the light flux superimposing section, occurrence of tailing is minimized, and a laser beam having a top hat type intensity distribution is obtained. In addition, since the single homogenizer optical element is used as described above, there is no need of a precise aligning mechanism, package manufacture becomes possible, and reduction in size of the lighting apparatus and reduction in manufacturing costs are facilitated.

In addition, in the lighting apparatus, the light flux dividing section may be constituted by a plurality of micro lens parts, and each of the micro lens parts may be a convex lens protruding toward the light source section.

According to this configuration, the laser beam emitted from the light source section is divided into the separate laser beams diffused from the micro lens parts by the plurality of micro lens parts. Accordingly, even when the excitation surface of the fluorescent material disposed in the superimposition region is larger than the opening surface of the micro lens part, occurrence of tailing is minimized, a distance between the homogenizer optical element and the fluorescent material is minimized, and reduction in size of the lighting apparatus is facilitated.

In the specification, "the excitation surface" of the fluorescent material includes the entire radiation surface in the fluorescent material to which the divided laser beam are superimposed and radiated, may be a surface of the fluorescent material according to a material, a configuration, or the like, of the fluorescent material, or may exist inside of the fluorescent material.

In addition, in the lighting apparatus, the radiation region perpendicular to the optical axis of the laser beam, which has been emitted from the light source section and reached the light flux dividing section, may have an elliptical shape, and the plurality of micro lens parts may be disposed to have symmetry about at least one axis of a major axis and a minor axis of the elliptical shape in the radiation region.

According to this configuration, an intensity distribution of a projection image of one side of the micro lens part disposed at a symmetrical position is complemented by an intensity distribution of a projection image of the other side, and a uniformity of the intensity distribution of the laser beam generated in the common radiation region is increased.

In addition, in the lighting apparatus, a shape of the micro lens part when seen from an incidence side of the laser beam may be similar to a shape of an excitation surface of the fluorescent material when seen from an incidence side of the separate laser beams.

According to this configuration, the radiation range of the laser beam generated in the first radiation region and the shape of the excitation surface of the fluorescent material substantially coincide with each other, and the laser beam radiated from the laser source is efficiently radiated to the fluorescent material.

In addition, in the lighting apparatus, the light flux superimposing section may be constituted by a single aspherical lens part that protrudes toward the fluorescent material.

According to this configuration, since the aspherical lens part is designed according to design parameters such as a radiation angle with respect to an optical axis of the laser beam radiated from the light source section, a magnification of the separate laser beams, or the like, the plurality of separate laser beams are efficiently superimposed on each other on the excitation surface of the fluorescent material disposed in the first radiation region. Accordingly, the intensity of the laser beam in which the intensity distribution in the first radiation region is reshaped to a top hat shape is further increased.

In addition, in the lighting apparatus, an excitation surface of the fluorescent material when seen from an incidence side of the separate laser beams may have a rectangular shape, the micro lens part when seen from an incidence side of the laser beam may have a rectangular shape similar to the rectangular shape of the excitation surface, a second radiation region perpendicular to the optical axis of the laser beam, which has been emitted from the light source section and reached the light flux dividing section, may have an elliptical shape, and a narrow angle formed between a major axis of the elliptical shape of the second radiation region and a long side of the micro lens part when seen from the incidence side of the laser beam may be 45° or more and 90° or less.

According to this configuration, the laser beam radiated to the region other than the first radiation region is reduced, and a laser beam having a uniform intensity distribution with small tailing is radiated to the excitation surface of the fluorescent material by the light flux superimposing section.

In addition, in the lighting apparatus, the plurality of light source sections may be provided in a direction perpendicular to the optical axis, and the light source section may include a laser source and a fiber connected to the laser source.

According to this configuration, since high luminance of the laser beam is achieved according to the number of light source sections by providing the plurality of light source sections, a laser beam having high luminance is radiated to the fluorescent material, and stronger fluorescence is emitted from the fluorescent material.

In addition, in the lighting apparatus, the light flux dividing section may be constituted by a plurality of micro lens parts, an excitation surface of the fluorescent material when seen from an incidence side of the separate laser beams may have a rectangular shape, the micro lens part when seen from an incidence side of the laser beam emitted from the plurality of light source sections may have a rectangular shape similar to the rectangular shape of the excitation surface, and a narrow angle formed between an arrangement direction of the plurality of light source sections and a long side of the micro lens part when seen from the incidence side of the laser beam emitted from the plurality of light source sections may be 45° or more and 90° or less.

According to this configuration, like the case in which a shape of the second radiation region when seen from the incidence side of the single laser beam is an elliptical shape, the amount of the laser beam radiated to the region other than the first radiation region is reduced, and the laser beam having a uniform intensity distribution with small tailing is radiated to the excitation surface of the fluorescent material by the light flux superimposing section.

According to the aspect of the present invention, a lighting tool for a vehicle including a lighting apparatus is provided.

According to the lighting tool for a vehicle of the aspect, since the lighting apparatus is provided, utilization efficiency of the laser beam from the laser source is increased, and reduction in size and reduction in manufacturing costs are easily achieved.

According to the aspect of the present invention, it is possible to provide a lighting apparatus and a lighting tool for a vehicle that are capable of increasing a utilization efficiency of a laser beam and facilitating reduction in size and reduction in manufacturing costs.

BRIEF DESCRIPTION OF THE DRAWINGS

FIG. 15A is a view for explaining a laser beam formed by a lighting apparatus of an example, showing a light flux dividing section and a radiation region of a laser beam radiated to the light flux dividing section.

FIG. 15B is the view for explaining the laser beam formed by the lighting apparatus of the example, showing a 2-dimensional intensity distribution of the laser beam in a first radiation region.

FIG. 15C is the view for explaining the laser beam formed by the lighting apparatus of the example, showing a one-dimensional intensity distribution when seen in an x-axis direction at a position of y=0 of the 2-dimensional intensity distribution in FIG. 15B.

DETAILED DESCRIPTION OF THE INVENTION

Figure 1:
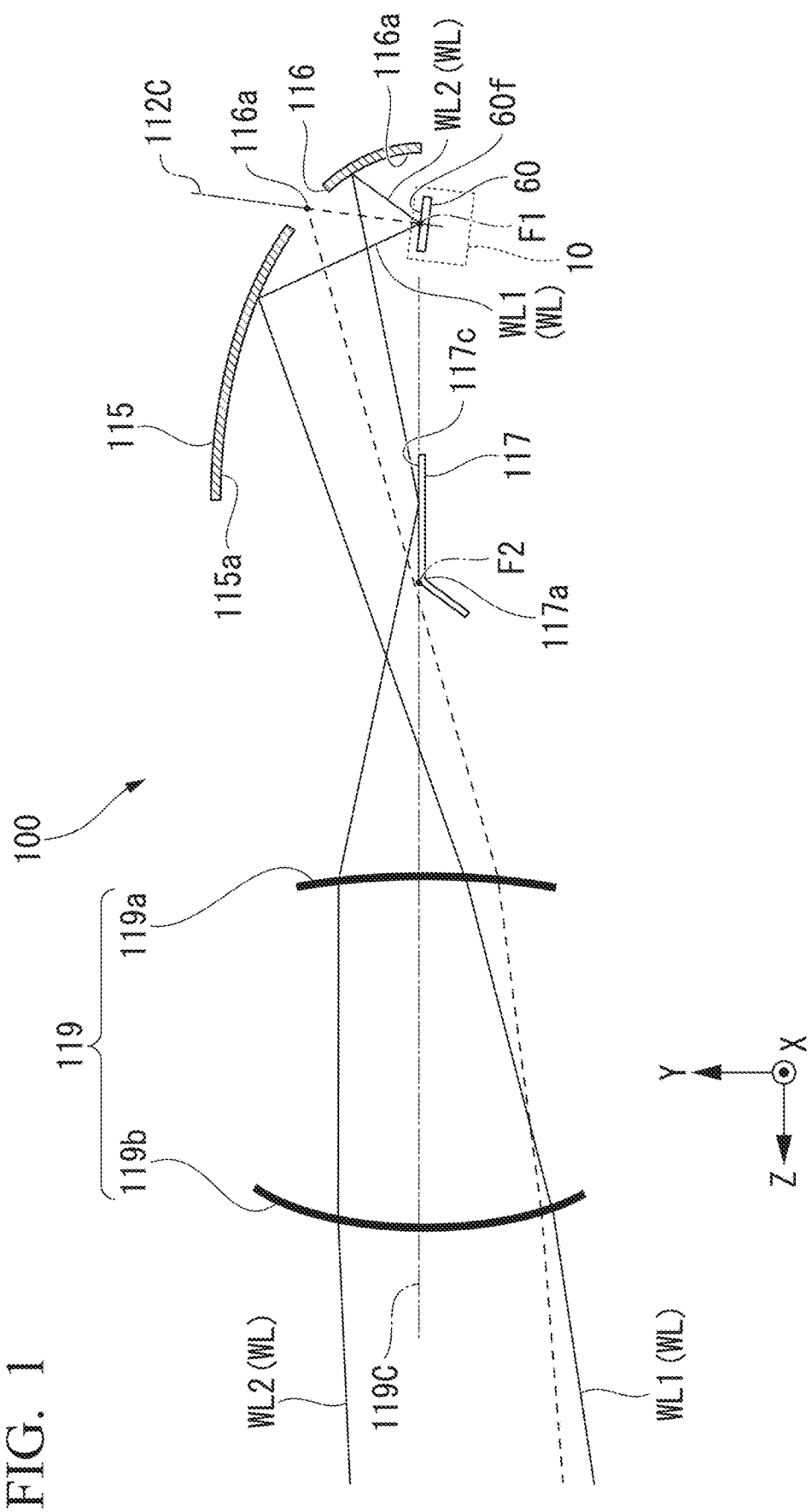
FIG. 1 is a side view showing a schematic configuration of a lighting tool for a vehicle according to a first embodiment.

Next, a lighting apparatus and a lighting tool for a vehicle according to embodiments will be described with reference to the accompanying drawings. The embodiments described below are merely exemplary, and the embodiments to which the present invention is applied are not limited to the following embodiments. Further, in all of the drawings, components having the same function are designated by the same reference numerals, and repeated description thereof will be omitted.

First Embodiment

FIG. 1 is a side view showing a schematic configuration of a lighting tool 100 for a vehicle according to an embodiment. In the drawings used in description of the lighting tool 100 for a vehicle, an XYZ coordinate system may be used as a 3-dimensional orthogonal coordinate system. Hereinafter, in the XYZ coordinate system, an X-axis direction is a vehicle leftward/rightward direction in which a lighting tool for a vehicle is mounted, a Y-axis direction is a vehicle upward/downward direction, and a Z-axis direction is a vehicle forward/rearward direction.

As shown in FIG. 1, the lighting tool 100 for a vehicle of the first embodiment includes a lighting apparatus 10 configured to emit light having a predetermined color or intensity, a reflector 115 configured to radiate light emitted from the lighting apparatus 10 to a front side in the Z-axis direction (a left side in the drawing of FIG. 1), a shade 117 and a projection lens 119.

The lighting apparatus 10 of the embodiment includes a fluorescent material 60 configured to generate white light. A specific configuration of the lighting apparatus 10 will be described below.

The reflector 115 is provided above the fluorescent material 60, and specifically, faces a fluorescence surface 60$f$ of the fluorescent material 60 that strongly emits white light WL. The reflector 115 has a reflecting surface 115$a$ configured to reflect the white light WL from the fluorescent material 60 while causing the white light WL to converge on a front side in the Z-axis direction.

The reflecting surface 115$a$ includes an elliptical surface that uses an incidence side focus F2 of the projection lens 119 and a center F1 of the fluorescence surface 60$f$ as a focus. The elliptical surface has a shape that reflects light from the center F1 toward the vicinity of the incidence side focus F2.

The reflector 115 has a transmission hole 116. The transmission hole 116 is a hole configured to allow a strong beam to pass therethrough and separate the strong beam from a route of the white light WL, for example, in a case in which the fluorescent material 60 or the lighting apparatus 10 falls out of a predetermined position and a strong beam from an excitation light source (that is a laser source 20, which will be described below, for example, a semiconductor laser or the like) of the fluorescent material 60 is directly emitted without being converted into the white light WL, or the like.

The shade 117 reflects the white light WL from the fluorescent material 60 or the reflector 115 to a front side in the Z-axis direction while shielding and restricting some of the white light WL. Specifically, the shade 117 extends in the X-axis direction and the Z-axis direction at a front position in front of the fluorescent material 60 in the Z-axis direction. The shade 117 includes a front edge 117$a$ disposed in the vicinity of the incidence side focus F2 of the projection lens 119 and a reflecting surface 117$c$ extending rearward from the front edge 117$a$ in the Z-axis direction.

The front edge 117$a$ shields some of the white light WL from the fluorescent material 60 or the reflector 115 and forms a cutoff line in a light distribution pattern of a passing beam using an edge shape of the front edge 117$a$. The reflecting surface 117$c$ is a surface extending rearward from the front edge 117$a$ in a direction along an optical axis 119C (i.e., the Z-axis direction), and reflects the white light WL from the fluorescent material 60 and the reflector 115 toward an upper side in the Y-axis direction.

The projection lens 119 is provided in front of the reflector 115 in the Z-axis direction, and radiates the white light WL from the fluorescent material 60 or the reflector 115 to a front side. In the embodiment, the projection lens 119 is disposed to radiate a light distribution pattern including a shape defined by the shade 117 to a front side in the Z-axis direction. The projection lens 119 has an incidence surface 119$a$ and an emission surface 119$b$. Light that has reached the vicinity of the incidence side focus F2 directly from or reflected by the fluorescent material 60 is projected to a front side in the Z-axis direction by the projection lens 119.

A cross section of the projection lens 119 in the Y-axis direction is formed to emit light entering the incidence surface 119$a$ through the incidence side focus F2 at different angles in the Y-axis direction as parallel beams. A cross section of the projection lens 119 in the X-axis direction is formed to emit light entering the incidence surface 119$a$ through the incidence side focus F2 at different angles in the X-axis direction as parallel beams.

In the lighting tool 100 for a vehicle having the above-mentioned configuration, among the white light WL emitted from the fluorescent material 60, the white light WL1 entering the reflecting surface 115$a$ of the reflector 115 in front of the transmission hole 116 in the Z-axis direction passes above the incidence side focus F2 in the Y-axis direction, is radiated to a side in front of the incidence side focus F2 in the Z-axis direction, and enters below the optical axis 119C of the projection lens 119.

Meanwhile, in the lighting tool 100 for a vehicle having the above-mentioned configuration, among the white light WL emitted from the fluorescent material 60, the white light WL2 entering a reflecting surface 116$a$ of a rear section of the reflector 115 behind the transmission hole 116 in the Z-axis direction is reflected by the reflecting surface 117$c$ of the shade 117 and reaches above the optical axis 119C of the projection lens 119. Accordingly, according to the lighting tool 100 for a vehicle, the white lights WL1 and WL2 emitted from the projection lens 119 form a light distribution pattern having a predetermined cutoff line at an upper end on a virtual screen set at 25 m in front of a vehicle (not shown).

Further, the lighting tool 100 for a vehicle shown in FIG. 1 is an aspect of the lighting tool for a vehicle including the lighting apparatus 10, and the lighting tool for a vehicle including the lighting apparatus 10 is not limited to the lighting tool 100 for a vehicle shown in FIG. 1. An arbitrary configuration may be applied as the configuration of lighting tool for a vehicle other than the lighting apparatus 10.

Figure 2:
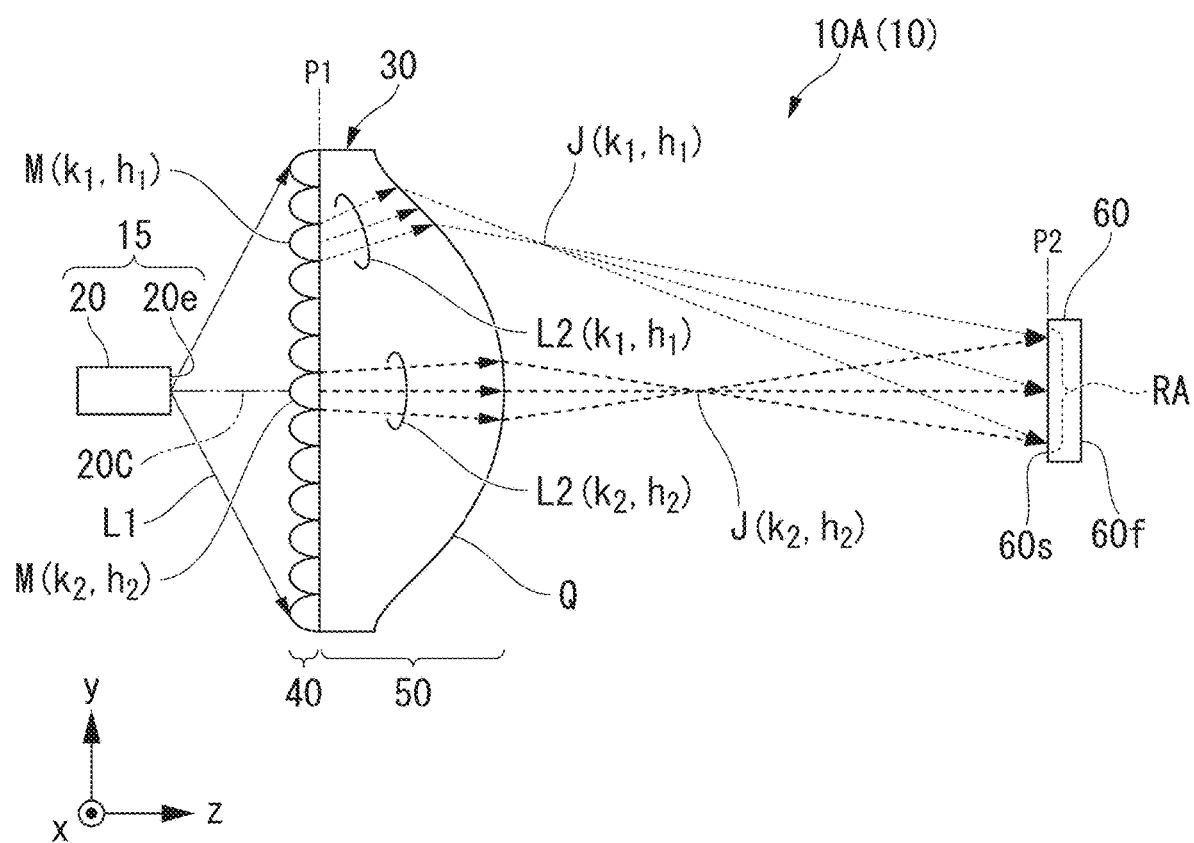
FIG. 2 is a side view showing a schematic configuration of a lighting apparatus according to the first embodiment.

Next, a lighting apparatus 10A of the first embodiment will be described. The lighting apparatus 10A is used as the lighting apparatus 10 of the lighting tool 100 for a vehicle of the first embodiment. FIG. 2 is a side view showing a schematic configuration of the lighting apparatus 10A according to the embodiment. In the drawings used in description of the lighting apparatus 10A, an xyz coordinate system may be used as a 3-dimensional orthogonal coordinate system. Hereinafter, in the xyz coordinate system, an x-axis direction is a leftward/rightward direction in the lighting apparatus 10A, a y-axis direction is an upward/downward direction in the lighting apparatus 10A, and a z-axis direction is a forward/rearward direction along a route of a laser beam L1 emitted from the laser source 20 in the lighting apparatus 10A.

As shown in FIG. 2, the lighting apparatus 10A of the embodiment includes a light source section 15, a homogenizer optical element 30 and the fluorescent material 60.

The light source section 15 has a configuration of being able to emit the laser beam L1 spreading about the optical axis. The light source section 15 of the first embodiment is constituted by the laser source 20.

The laser source 20 is an excitation light source of the fluorescent material 60, and emits the laser beam L1 that is diffused from an emission surface 20e about an optical axis 20C. While a type of the laser source 20 is not particularly limited, when an intensity distribution in a plane of the laser source 20 perpendicular to the z-axis direction (i.e., in a plane including the x-axis direction and the y-axis direction) is a Gaussian type, an effect of the homogenizer optical element 30, which will be described below, is greatly exhibited. For example, an end surface emission type semiconductor laser, a vertical cavity surface emitting laser (VCSEL), a photonic crystal surface-emitting semiconductor laser (PCSEL), or the like, may be provided as the laser source 20 that emits the laser beam L1 having a Gaussian type intensity distribution. In the embodiment, the laser source 20 is assumed to be an end surface emission type semiconductor laser, which will be described below.

Figure 3:
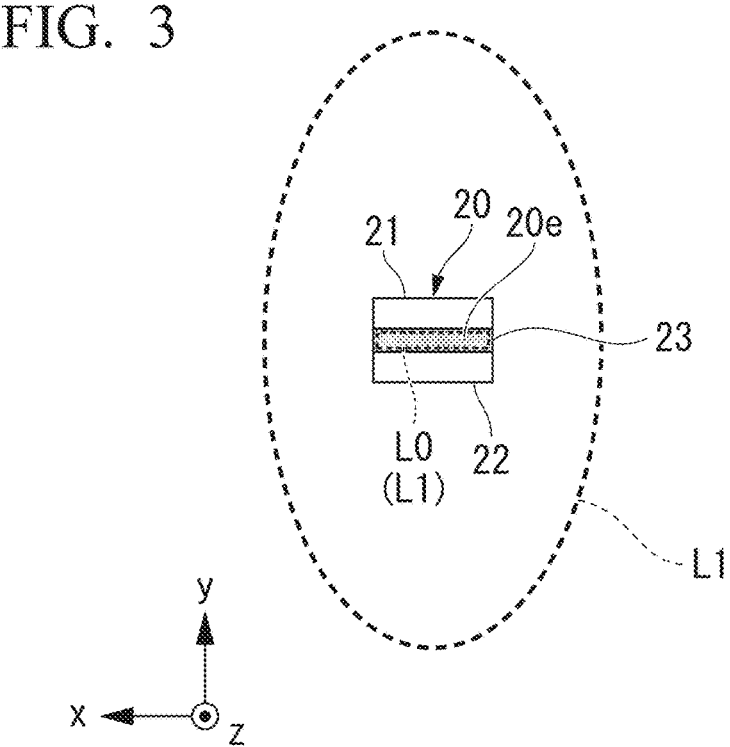
FIG. 3 is a rear view of a laser source of the lighting apparatus shown in FIG. 2.

FIG. 3 shows the emission surface 20e of the laser source 20, a beam shape of the emission surface 20e, a beam shape of a laser beam L0 in a so-called near field region, and a beam shape of the laser beam L1 in a so-called far field region that has propagated a predetermined distance toward a front side in the z-axis direction after emission from the emission surface 20e. As shown in FIG. 3, as is well known, the laser source 20 has a clad layer 21 formed of a p-type semiconductor or the like, a clad layer 22 formed of an n-type semiconductor or the like, and an active layer 23 sandwiched between the clad layers 21 and 22 in the Y-axis direction. The emission surface 20e has an end surface of the active layer 23 on the front side in the z-axis direction. A beam shape of the laser beam L0 immediately after emission from the emission surface 20e is a rectangular shape in which a major axis is parallel to the x-axis direction and a minor axis is parallel to the y-axis direction. Meanwhile, a beam shape of the laser beam L1 propagated from the emission surface 20e to a far field region is an elliptical shape in which a major axis is parallel to the y-axis direction and a minor axis is parallel to the x-axis direction.

As shown in FIG. 2, the homogenizer optical element 30 has a light flux dividing section 40 disposed on a rear side of the laser source 20 in the z-axis direction to face the laser source 20, and a light flux superimposing section 50 disposed on a rear side of the fluorescent material 60 in the z-axis direction to face the fluorescent material 60. The light flux superimposing section 50 is formed integrally with the light flux dividing section 40.

The light flux dividing section 40 divides the laser beam L1 emitted from the emission surface 20e (the laser source 20) while being diffused about the optical axis 20C into a plurality of separate laser beams L2 on a plane P1 perpendicular to the optical axis 20C. The laser beam L1 is partially cut out on the predetermined plane P1 by the light flux dividing section 40, and divided into the separate laser beams L2 having a small intensity difference between both ends in an arbitrary direction (for example, the x-axis direction and the y-axis direction) in the predetermined plane P1. Since incident directions and incident angles of the laser beam L1 to the light flux dividing section 40 are different according to positions in the predetermined plane P1, directions of advance of the plurality of separate laser beams L2 are different from each other.

Figure 4:
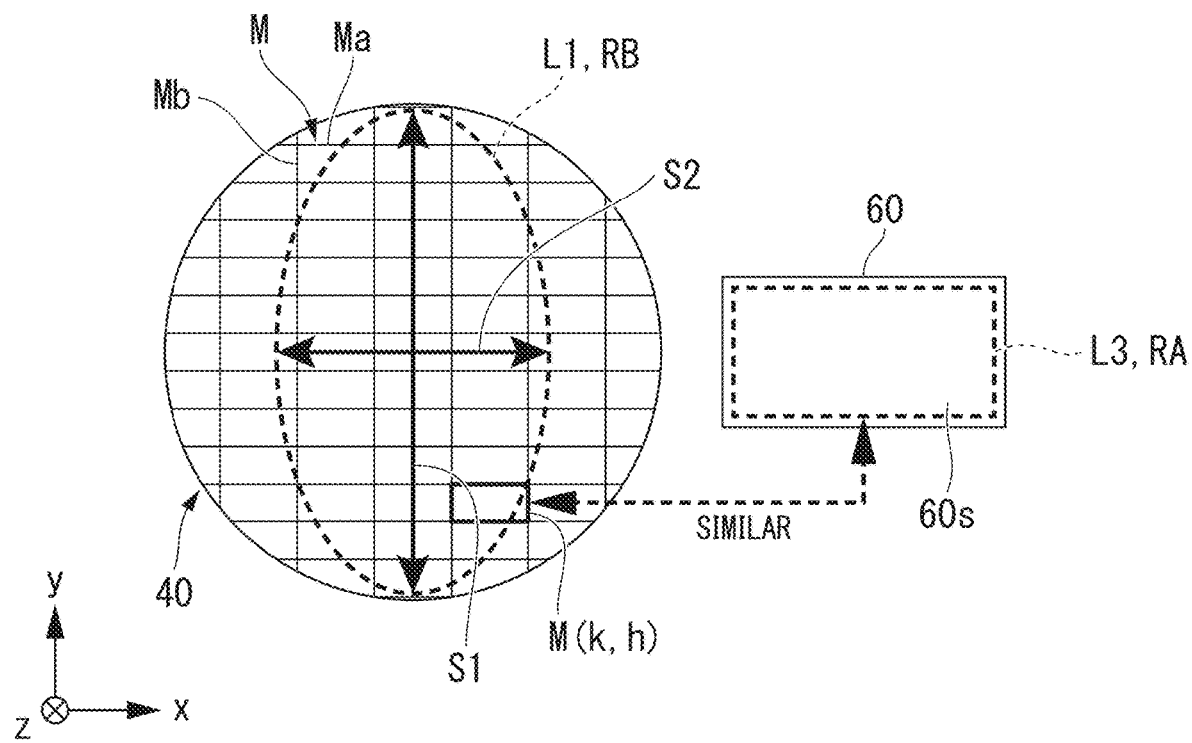
FIG. 4 is a front view of a light flux dividing section and a fluorescent material of the lighting apparatus shown in FIG. 2.

FIG. 4 is a view showing the light flux dividing section 40 and the fluorescent material 60 from a rear side in the z-axis direction. As shown in FIG. 4, the light flux dividing section 40 of the embodiment is constituted by a plurality of micro lens parts M arranged to be adjacent to each other in the x-axis direction and the y-axis direction. Hereinafter, as shown in FIG. 4, a counting order of a column of the plurality of micro lens parts M is increased as it goes from a rear side to a front side (from a left side to a right side in the drawing of FIG. 4) in the x-axis direction. In addition, a counting order of a row of the plurality of micro lens parts M is increased as it goes from a front side to a rear side (from an upper side to a lower side in the drawing of FIG. 4) in the y-axis direction. In FIG. 4, the micro lens part M of a $k^{th}$ row and an $h^{th}$ column is shown as the micro lens part M (k, h). The characters k and h (and the characters with subscript natural numbers) are natural numbers. In addition, in FIG. 1, the divided laser beam L2 emitted from the micro lens part M (k, h) is shown as the divided laser beam L2 (k, h). In the specification, when contents common to the plurality of micro lens parts M (1, 1) . . . , M (k, h) are described, the micro lens parts M (1, 1) . . . , M (k, h) are collectively referred to as "the micro lens parts M."

In addition, when contents common to the plurality of separate laser beams L2 (1, 1) . . . , L2 (k, h) are described, the separate laser beams L2 (1, 1) . . . , L2 (k, h) are collectively referred to as "the separate laser beams L2."

The laser beam L1 is finely divided and averaged as the number of the micro lens parts M included in a radiation range (a second radiation region) RB of the laser beam L1 on the predetermined plane P1 is increased. As described above, in view of the fact that the laser source 20 is an end surface emission type semiconductor laser, it is preferably so that the plurality of micro lens parts M fall within a range of a major axis S1 and a minor axis S2 of a radiation range RB of the laser beam L1. Specifically, it is preferably so that at least two or more micro lens parts M fall within a range of axes of the major axis S1 and the minor axis S2, and for example, it is preferably so that three or more and ten or less of micro lens parts M fall within a range of axes of the major axis S1 and the minor axis S2.

Each of the micro lens parts M is a convex lens that protrudes toward the laser source 20. The separate laser beams L2 emitted from the micro lens part M that is the convex lens are diffused rearward from the predetermined plane P1 in the z-axis direction (see FIG. 2). Accordingly, the micro lens parts M reshape shapes and intensity distributions of the separate laser beams L2 radiated to the fluorescent material 60. That is, the micro lens parts M partially cut the laser beam L1 using the predetermined plane P1, and reduces a difference in intensity between both ends of the separate laser beams L2 in an arbitrary direction on the predetermined plane P1. At the same time, the micro lens parts M expands the separate laser beams L2 throughout the x-axis direction and the y-axis direction, and occurrence of tailing is effectively minimized by the light flux superimposing section 50 when the plurality of separate laser beams 12 are superimposed on each other.

In a front view from a rear side to a front side in the z-axis direction (hereinafter, simply referred to as "in a front view"), a shape of the micro lens parts M is similar to a shape of a laser beam L3 projected to an excitation surface 60s of the fluorescent material 60 by the light flux superimposing section 50, radiated to a predetermined plane P2 including the excitation surface 60s and obtained by superimposing the plurality of separate laser beams L2. That is, a shape of the micro lens parts M when seen from an incidence side of the laser beam L1 is similar to a shape of the excitation surface 60s of the fluorescent material 60 when seen from the incidence side of the separate laser beams L2.

In the lighting apparatus 10A, when seen in a front view, the laser beam L3 is preferably radiated uniformly throughout the excitation surface 60s of the fluorescent material 60. That is, a radiation range of the laser beam L3 on the predetermined plane P2 preferably coincides with that on the excitation surface 60s. In the embodiment, the excitation surface 60s is assumed to have a rectangular shape in which a long side is parallel to the x-axis direction and a short side is parallel to the y-axis direction. From a viewpoint that a radiation range of the laser beam L3 substantially coincides with a shape of the excitation surface 60s, when seen in a front view, shapes of the plurality of micro lens parts M are preferably similar to a shape of the excitation surface 60s. Specifically, shapes of the plurality of micro lens parts M are rectangular shapes, which are common to each other, in which a long side Ma is parallel to the x-axis direction and a short side Mb is parallel to the y-axis direction, and are similar to a shape of the excitation surface 60s.

Specifically, in consideration of a physical parameter of the laser source 20, a shape of the emission surface 20e, a radiation angle of the laser beam L1, or the like, sizes of the micro lens parts M are appropriately set to satisfy the above-mentioned appropriate conditions.

The plurality of micro lens parts M are preferably disposed to have symmetry within a radiation range on the predetermined plane P1 of the laser beam L1. As described above, an intensity difference of the laser beam L1 entering the plurality of micro lens parts M is smaller than the entire intensity difference of the laser beam L1 before entering. For this reason, as shown in FIG. 4, when the plurality of micro lens parts M are disposed to form line symmetry and point symmetry about the major axis S1 and the minor axis S2 within the radiation range RB on the predetermined plane P1 of the laser beam L1, an intensity distribution of a projection image of one side of the micro lens parts M at symmetrical positions (i.e., equivalent positions) is complemented by an intensity distribution of a projection image of the other side, and uniformity of the intensity distribution of the laser beam L3 is increased. While uniformity of the intensity distribution of the laser beam L3 is improved as combinations of the micro lens parts M disposed to form line symmetry and point symmetry about the major axis S1 and the minor axis S2 in the radiation region RB on the predetermined plane P1 of the laser beam L1 are increased, when the plurality of micro lens parts M are disposed to have symmetry about at least one of at least the major axis S1 and the minor axis S2, uniformity of the intensity distribution of the laser beam L3 preferably becomes good.

Like the embodiment, when the radiation region RB has anisotropy while including the case in which the radiation region RB of the laser beam L1 on the predetermined plane P includes the major axis S1 and the minor axis S2, when seen in a front view, a narrow angle formed between the major axis S1 or the axial direction corresponding to the major axis in the anisotropy (i.e., an axial direction in which the intensity distribution is widest) and the long side Ma of the micro lens parts M is preferably 45° or more and 90° or less and more preferably 67.5° or more and 90° or less, and most preferably, the major axis S1 or the axial direction corresponding to the major axis in the anisotropy is perpendicular to the long side Ma of the micro lens parts M. As described above, when the major axis S1 or the axial direction corresponding to the major axis in the anisotropy is appropriately disposed with respect to the long side Ma of the micro lens parts M, the separate laser beams L2 radiated to the region except a radiation region RA is reduced, and the laser beam having the intensity distribution uniformized by the light flux superimposing section 50 (to be described below) and having small tailing is radiated to the excitation surface 60s of the fluorescent material 60.

Further, the light flux dividing section 40 may be constituted by a plurality of anomorphic lens units having different magnifications in the x-axis direction and the y-axis direction instead of the plurality of micro lens parts M. When the plurality of anomorphic lens units are used, even though a shape of the anomorphic lens unit when seen in a front view is a square shape, a projection image of the plurality of separate laser beams L2 can be reshaped to a rectangular shape similar to the excitation surface 60s having a rectangular shape when seen in a front view as shown in FIG. 4, and can be radiated to the excitation surface 60s. However, from a viewpoint that a decrease in alignment accuracy of the laser source 20, the light flux superimposing section 50 and the fluorescent material 60 is minimized, when seen in a front view, the light flux dividing section 40 is preferably constituted by the plurality of micro lens parts M having a shape similar to a shape of the excitation surface 60s.

The light flux superimposing section 50 is superimposed on the plurality of separate laser beams L2 emitted from the light flux dividing section 40 on the radiation region (the first radiation region) RA in common. As shown in FIG. 2, the light flux superimposing section 50 of the embodiment is constituted by a single aspherical lens part Q that protrudes toward the fluorescent material 60. A curved surface of the aspherical lens part Q on the front side in the z-axis direction is unmistakably determined by determining incidence side parameters such as sizes of the plurality of micro lens parts M, a spreading angle of the separate laser beams L2, a size of the radiation region RA, (i.e., a magnification of the radiation region RA with respect to the sizes of the micro lens parts M), and so on, and the emission parameter.

As shown in FIG. 2, the separate laser beams L2 divided by the plurality of micro lens parts M enter the aspherical lens part Q while being diffused. The separate laser beams L2 are imaged once at predetermined imaging points J by the aspherical lens part Q, diffused toward the common radiation region RA, and are superimposed on each other in the radiation region RA on the predetermined plane P2.

Figure 5:
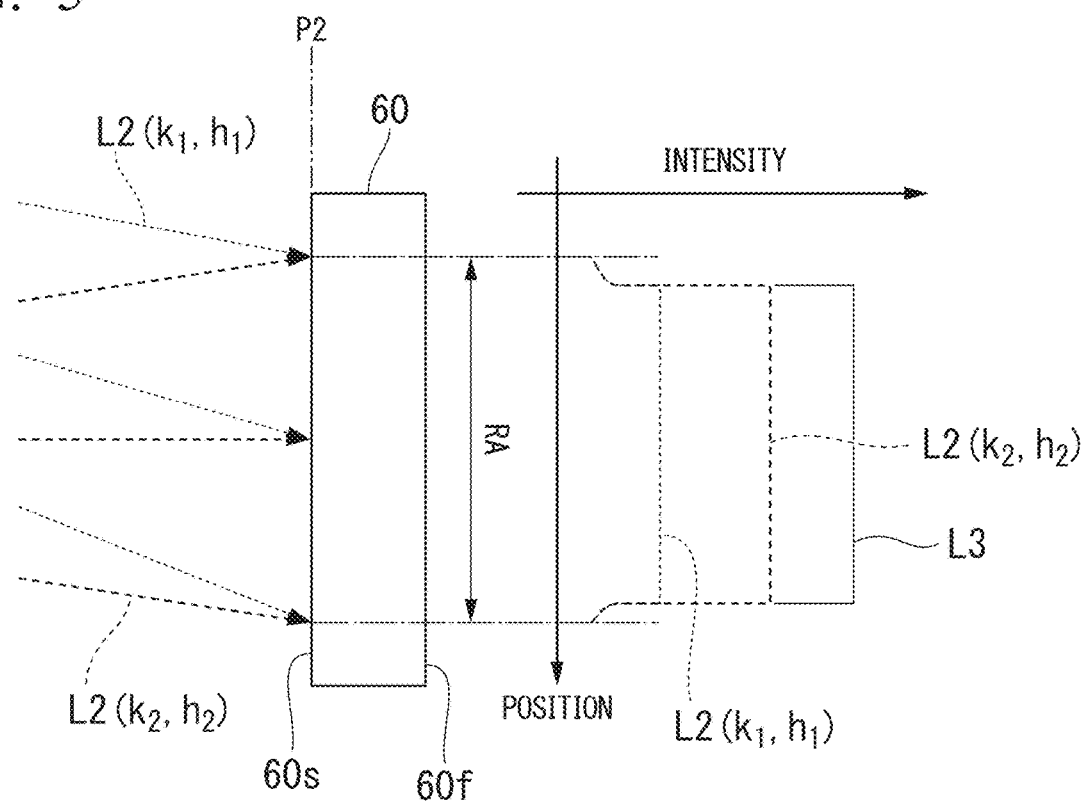
FIG. 5 is a schematic view showing an aspect in which a plurality of separate laser beams are superimposed on each other in a radiation region on an excitation surface of the fluorescent material of the lighting apparatus shown in FIG. 2.

FIG. 5 is a schematic view showing an aspect in which the separate laser beams L2 are superimposed on each other in the radiation region RA on the excitation surface 60s of the fluorescent material 60. In FIG. 2 and FIG. 5, among the plurality of separate laser beams L2, the separate laser beams L2 ($k_1$, $h_1$), L2 ($k_2$, $h_2$) emitted from the micro lens parts M ($k_1$, $h_1$), M ($k_2$, $h_2$) are exemplified, and an aspect in which the imaging point J ($k_1$, $h_1$), J ($k_2$, $h_2$) and the separate laser beams L2 ($k_1$, $h_1$), L2 ($k_2$, $h_2$) are superimposed on each other and the intensity distribution in the radiation region RA are shown.

As exemplified in FIG. 5, since the plurality of separate laser beams L2 are superimposed on each other in the radiation region RA on the predetermined plane P2, the intensity distributions of the plurality of separate laser beams L2 are added and complemented to each other, and the laser beam L3 having a top hat type intensity distribution is generated. As described above, since a difference in intensity distribution of the plurality of separate laser beams L2 in the x-axis direction or the y-axis direction is small, occurrence of tailing in the laser beam L3 is minimized. That is, the intensity distribution of the laser beam L3 rises sharply to a predetermined intensity from the outer circumferential end of the radiation region RA and becomes substantially uniform throughout the radiation region RA after rise.

Figure 6:
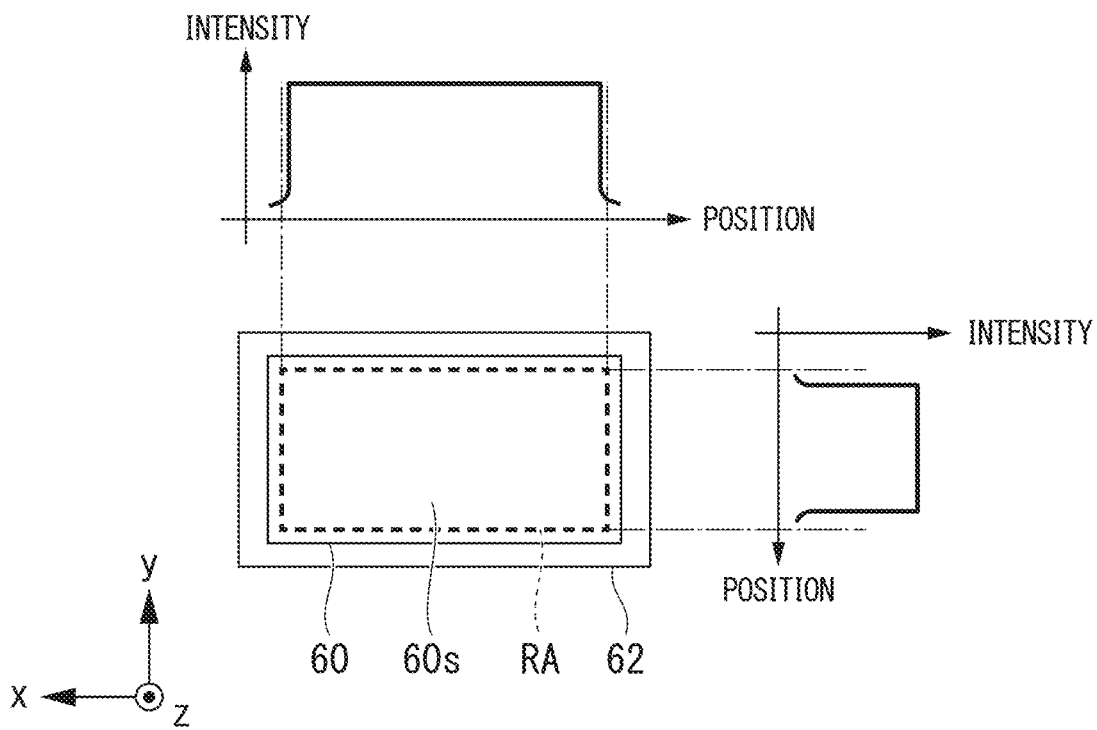
FIG. 6 is a schematic view showing an intensity distribution of a laser beam radiated to the fluorescent material.
Figure 7:
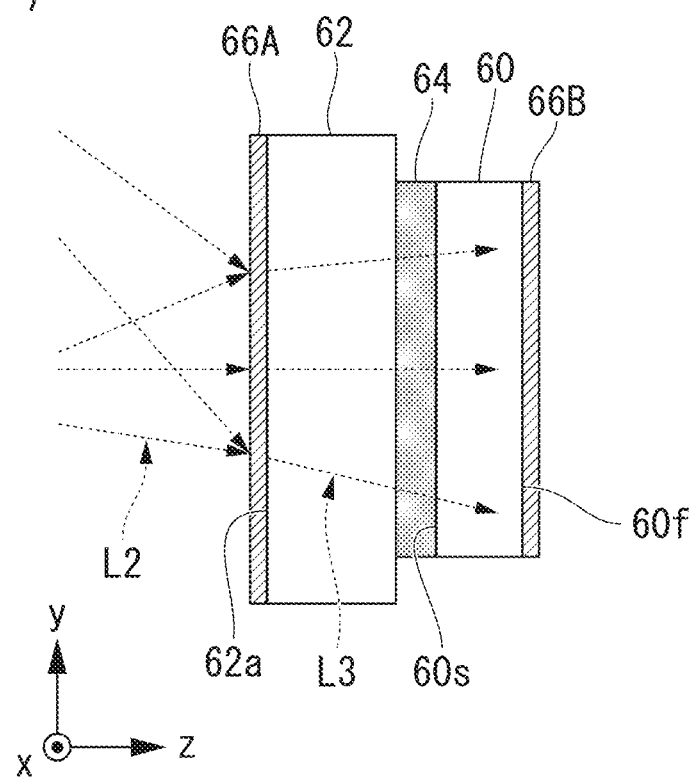
FIG. 7 is a side view of the fluorescent material of the lighting apparatus according to the first embodiment.

FIG. 6 is a view showing the intensity distribution of the laser beam L3 on the excitation surface 60s. The fluorescent material 60 is not particularly limited as long as the fluorescent material 60 can be excited by the laser beam L3 and white light can be emitted toward a front side in the z-axis direction. The fluorescent material 60 of the embodiment is assumed such that fluorescent material powder such as YAG: Ce or the like is distributed in a transparent medium. FIG. 7 is a side view of the fluorescent material 60.

As described above, it is preferable that the fluorescent material 60 has at least the excitation surface 60s that has substantially the same shape as that of the radiation region RA when seen in a front view. Fluorescence is generated in the fluorescent material 60 irradiated with the laser beam L3. Here, parts of the laser beam L3 and the fluorescence are scattered and propagated toward a front side or the like in the z-axis direction. When the fluorescent material 60 is excessively larger than the radiation region RA, the parts of the laser beam L3 and the fluorescence expand outward from the radiation range RA, and irregularity of luminance in white light may occur. Meanwhile, when the fluorescent material 60 is excessively smaller than the radiation region RA, since a part of the laser beam L3 passes through the fluorescent material 60 without being converted in wavelength by not irradiating the fluorescent material 60, color irregularity in the white light occurs or some of the white light cannot be used as illumination light of the lighting apparatus 10A or the lighting tool 100 for a vehicle, and optical utilization efficiency of the lighting apparatus 10A may be decreased.

When the lighting apparatus 10A requires bright white light, a thickness of the fluorescent material 60 in the z-axis direction is about 5 to 50 μm. As shown in FIG. 7, the fluorescent material is preferably supported by a support body 62 since the fluorescent material 60 is provided in such an extremely thin state. In the embodiment, since the intensity distribution of the laser beam L3 is reshaped to a top hat type, while the support body 62 can use the support body 62 obtained by mixing fine particles having vacancies (air) or a plurality of different refractive indices as a scattering material, a scattering function may not be provided or may be transparent with respect to blue light (a laser beam). That is, the laser beam scattered on the side opposite to the fluorescent material 60 is eliminated as in the related art by making the support body 62 transparent, and almost all the laser beams can be effectively used as excitation and illumination light of the fluorescent material 60.

In addition, the support body 62 is preferably formed of a material having heat dissipation and a high refractive index with respect to a wavelength of the laser beam L3. For example, a refractive index of the support body 62 is 1.5 or more and 3.5 or less. As such a material, haploid formed of a high temperature conductive transparent material such as sapphire, AlN, GaN, BN, or the like, is exemplified. Since the support body 62 is formed of a material having heat dissipation, an excessive increase in temperature of the fluorescent material 60 and a decrease in efficiency are minimized. In addition, since the support body 62 is formed of a material having a high refractive index, as shown by broken arrows in FIG. 7, a direction of advance of the separate laser beams L2 entering to be inclined with respect to a surface 62a of the support body 62 on the rear side in the z-axis direction is changed substantially perpendicularly to the surface 62a, and the laser beam L3 is generated. As a result, incidence efficiency of the laser beam L3 to the fluorescent material 60 is improved. In addition, since a direction of advance of the laser beam L3 is changed substantially perpendicularly to the surface 62a, an optical path length of the laser beam L3 in the fluorescent material 60 is substantially constantly, and chromaticity of white light is uniformized.

Further, from a viewpoint that the fluorescence is efficiently emitted to the fluorescent material 60 on the front side in the z-axis direction while minimizing loss of the fluorescence generated in the fluorescent material 60, in the z-axis direction, an appropriate optical film may be provided on the surface 62a of the support body 62, between the support body 62 and the fluorescent material 60 or the fluorescence surface 60f in front of the fluorescent material 60 in the z-axis direction. As the appropriate optical film, for example, a dichroic minor, an anti-reflection film (an AR coat), a dielectric multiplayer, or the like, is exemplified.

Since the fluorescent material 60 of the embodiment includes the fluorescent material powder such as YAG: Ce or the like as described above, the fluorescent material 60 is mainly excited by blue light (a peak wavelength; about 440 nm to 460 nm) and the fluorescence is emitted about yellow (a peak wavelength; about 700 nm). For this reason, a dichroic mirror 64 configured to cause blue light to pass therethrough and reflect yellow light is preferably provided between the support body 62 and the fluorescent material 60. Since the dichroic minor 64 is provided, a rearward scattering ingredient emitted from the fluorescent material 60 to a rear side in the z-axis direction can be reflected to a front side in the z-axis direction (i.e., an illumination direction of the lighting apparatus 10A).

From a viewpoint that the fluorescence is efficiently emitted to a front side of the fluorescent material 60 in the Z-axis direction, AR coats 66A and 66B serving as an optical film are also preferably provided on the surface 62a of the support body 62 and the fluorescence surface 60f of the fluorescent material 60. Since transmissivity in the dichroic mirror differs according to an incident angle of the laser beam L3 or the fluorescence, when the dichroic mirror is employed as the optical film, like the dichroic mirror 64, the dichroic mirror is preferably disposed at a position where the laser beam L3 is substantially parallelized in the z-axis direction by the support body 62 and then radiated. Further, when the fluorescent material 60 is supported by the support body 62, the support body 62 is regarded as a part of the fluorescent material 60 (a cover member), and the light flux superimposing section 50 is disposed to face the optical film provided on the support body 62 or the surface 62a.

As described above, the lighting apparatus 10A of the first embodiment includes the laser source 20, the homogenizer optical element 30 having the light flux dividing section 40 and the light flux superimposing section 50, and the fluorescent material 60.

In the lighting apparatus 10A of the embodiment, the laser beam L1 diffused and emitted from the laser source 20 is divided into the separate laser beams L2 having a small difference in intensity between both ends on the predetermined plane P1 by the light flux dividing section 40. Since the plurality of separate laser beams L2 are superimposed on each other in the common radiation region RA using the light flux superimposing section 50, occurrence of tailing like in the related art is minimized, and the laser beam L3 having a top hat type intensity distribution is obtained. According to the lighting apparatus 10A of the embodiment, the laser beam L1 emitted from the laser source 20 enters the light flux dividing section 40, the homogenizer optical element 30 with which the light flux dividing section 40 and the light flux superimposing section 50 are integrated is used, and further, the separate laser beams L2 emitted from the homogenizer optical element 30 enter the fluorescent material 60. As a result, optical loss from the laser source 20 to the fluorescent material 60 is minimized, and utilization efficiency of the laser beam L1 can be increased. In addition, since the homogenizer optical element 30, which is single, is used, a precise aligning mechanism is not required for a plurality of optical elements, and reduction in size of the lighting apparatus 10A and reduction in manufacturing costs can be achieved.

In addition, in the lighting apparatus 10A of the embodiment, the light flux dividing section 40 is constituted by the plurality of micro lens parts M, and the micro lens parts M are preferably a convex lens protruding toward the laser source 20.

According to the above-mentioned lighting apparatus 10A, even when the excitation surface 60s of the fluorescent material 60 disposed in the radiation region RA is larger than an opening surface of the micro lens parts M, occurrence of tailing like in the related art can be minimized. In addition, a distance between the homogenizer optical element 30 and the fluorescent material 60 is minimized, and reduction in size of the lighting apparatus 10A can be easily achieved.

In addition, in the lighting apparatus 10A of the embodiment, an intensity distribution in a surface perpendicular to the optical axis 20C of the laser beam L1 emitted from the laser source 20 is an elliptical shape, and the plurality of micro lens parts M are preferably disposed to have symmetry about at least one axis of the major axis S1 and the minor axis S2 in the elliptical radiation region RB of the laser beam L1. According to the above-mentioned lighting apparatus 10A, the intensity distribution of the projection image of the other side is complemented by the intensity distribution of the projection image of one side of the micro lens parts M disposed at symmetrical positions, and uniformity of the intensity distribution of the laser beam L3 generated by the radiation region RA can be increased.

In addition, in the lighting apparatus 10A of the embodiment, a shape of the micro lens parts M when seen from the incidence side of the laser beam L1 is preferably similar to a shape of the excitation surface 60s of the fluorescent material 60 when seen from the incidence side of the separate laser beams L2. According to the above-mentioned lighting apparatus 10A, the radiation range of the laser beam L3 generated in the radiation region RA substantially coincides with a shape of the excitation surface 60s of the fluorescent material 60, and the laser beam L1 emitted from the laser source 20 can be radiated to the fluorescent material 60.

In addition, in the lighting apparatus 10A of the embodiment, the light flux superimposing section 50 is preferably constituted by the single aspherical lens part Q that protrudes toward the fluorescent material 60. According to the above-mentioned lighting apparatus 10A, since the aspherical lens part Q is designed according to design parameters such as a radiation angle of the laser beam L1 with respect to the optical axis 20C, a magnification of the separate laser beams L2, and so on, it is possible to efficiently superimpose the plurality of separate laser beams L2 on the excitation surface 60s of the fluorescent material 60. As a result, intensity of the laser beam L3 in which the intensity distribution is reshaped to a top hat type can be improved.

In addition, in the lighting apparatus 10A of the embodiment, when seen in a front view, a narrow angle formed between the major axis S1 of the radiation region RB of the laser beam L1 on the predetermined plane P1 and the long side Ma of the micro lens parts M is 45° or more and 90° or less. Accordingly, the separate laser beams L2 radiated to the region except the radiation region RA are decreased, and the laser beam L3 having a uniform intensity distribution with small tailing using the light flux superimposing section 50 can be radiated to the excitation surface 60s of the fluorescent material 60.

Second Embodiment

Figure 8:
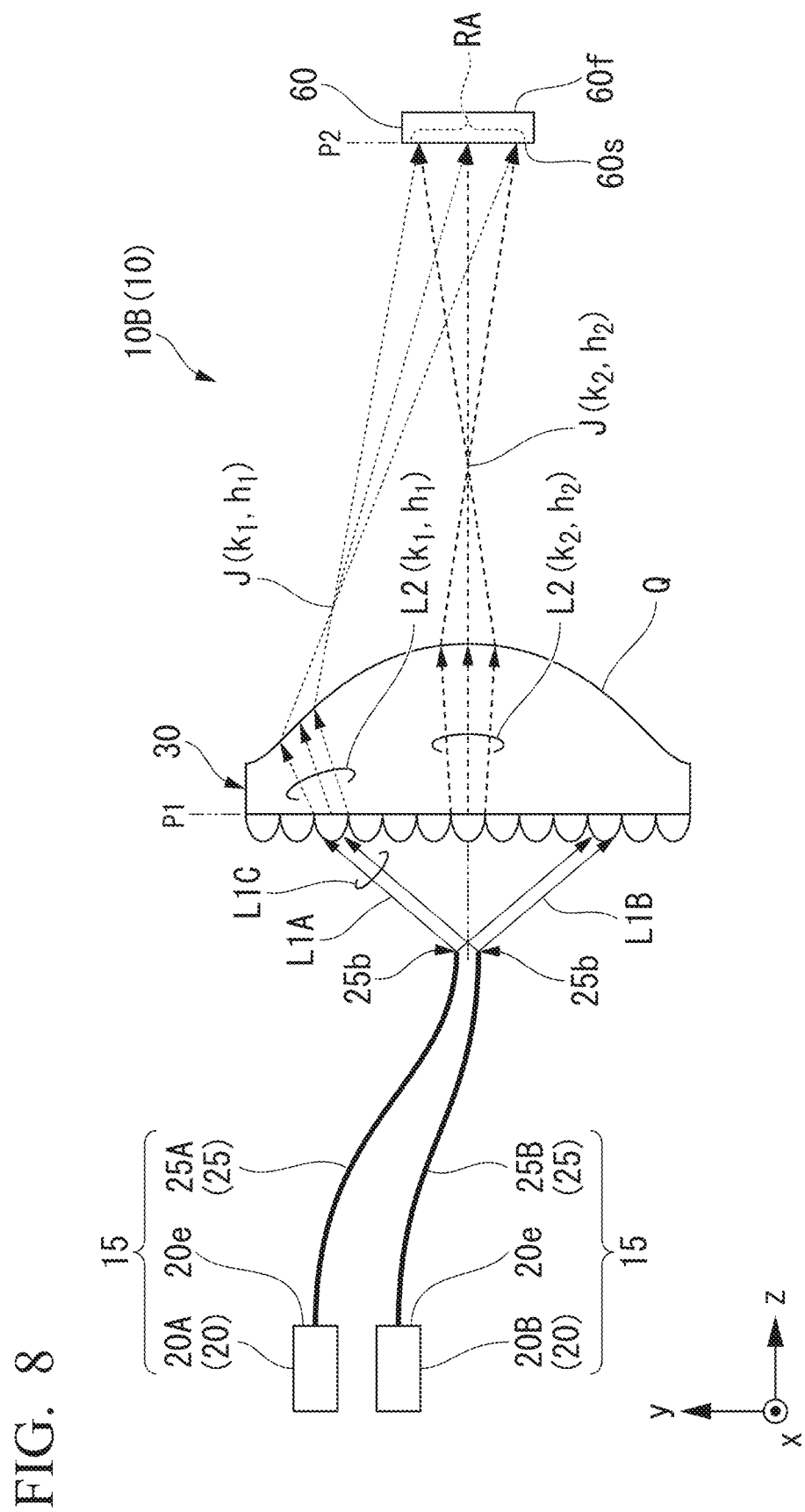
FIG. 8 is a side view showing a schematic configuration of the lighting apparatus according to the second embodiment.

Next, a lighting apparatus according to a second embodiment will be described. FIG. 8 is a side view of a lighting apparatus 10B according to the second embodiment. Further, in components and members of the lighting apparatus 10B of the second embodiment, the same components and members as those of the first embodiment are designated by the same reference numerals, and description thereof will be omitted.

As shown in FIG. 8, the lighting apparatus 10B of the second embodiment includes a plurality of light source sections 15, a homogenizer optical element 30 and a fluorescent material 60. Each of the light source sections 15 of the second embodiment has a laser source 20 and a fiber 25 connected to the laser source 20.

Figure 9:
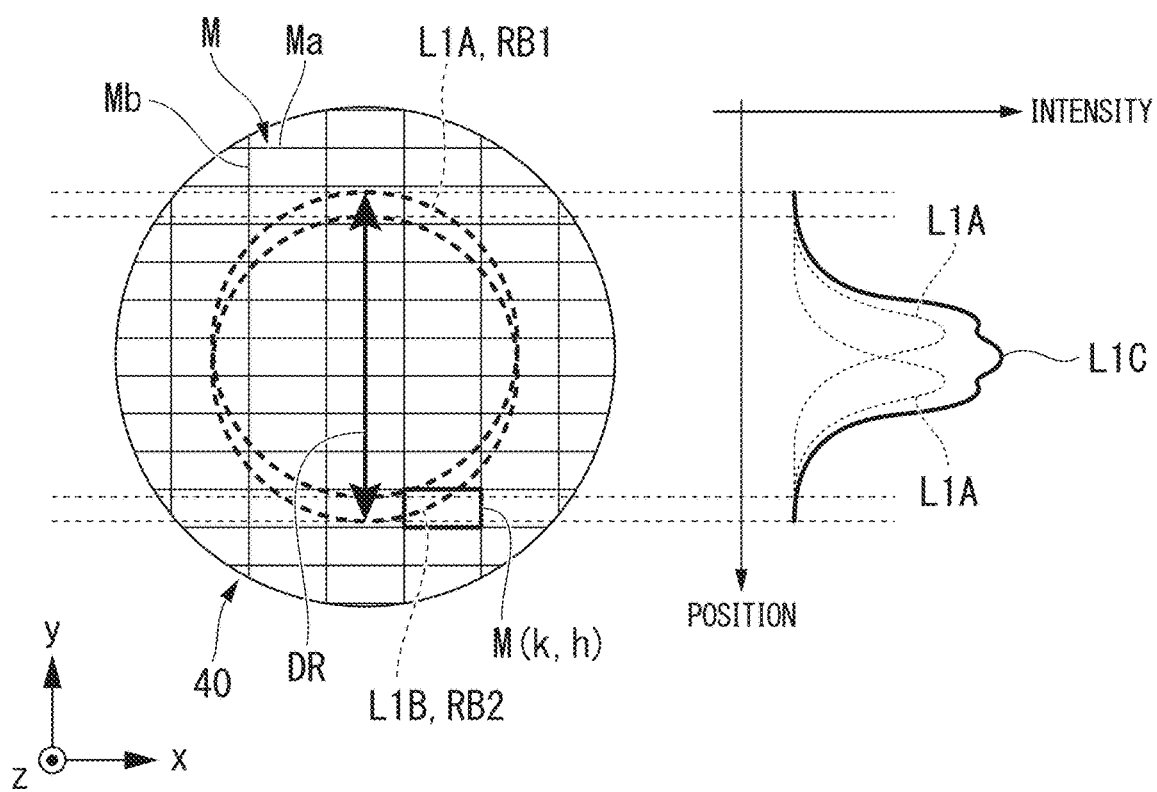
FIG. 9 is a front view of a light flux dividing section of the lighting apparatus shown in FIG. 8, schematically showing a radiation region and an intensity distribution of a laser beam radiated to the light flux dividing section.
Figure 10A:
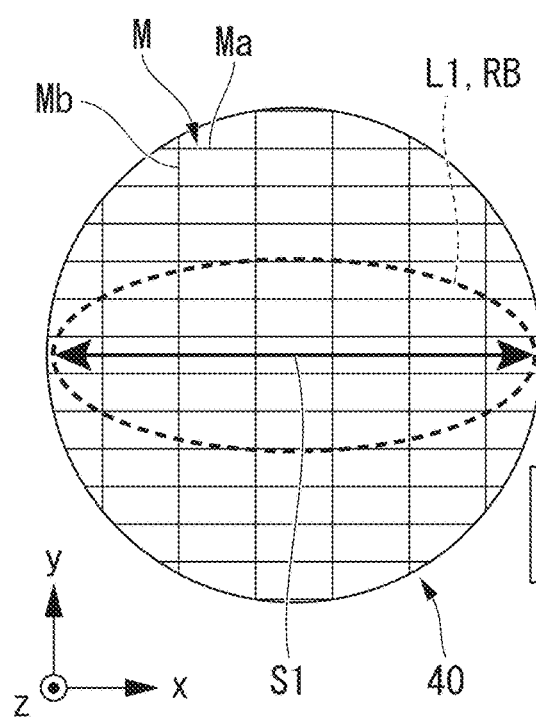
FIG. 10A is a view for explaining a laser beam formed by a lighting apparatus of an example, showing a light flux dividing section and a radiation region of a laser beam radiated to the light flux dividing section.
Figure 10B:
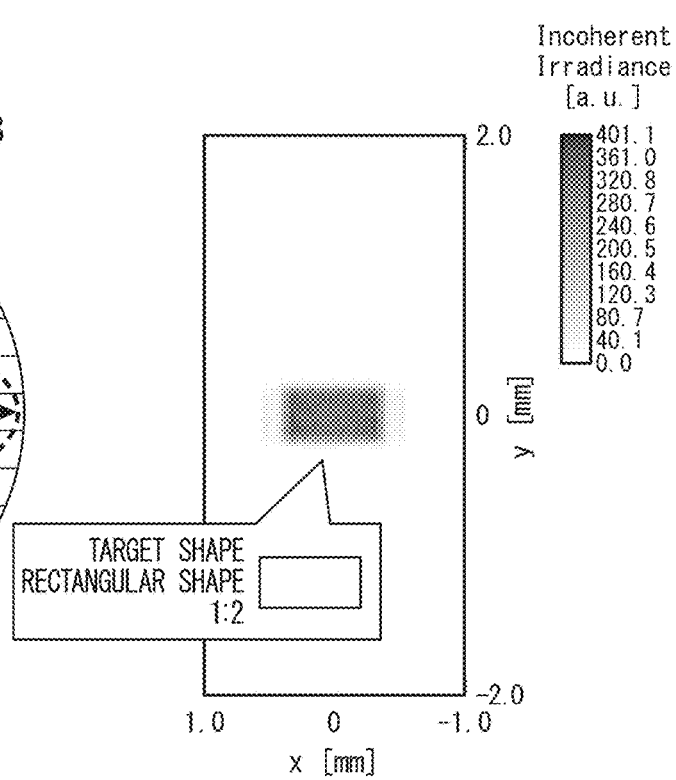
FIG. 10B is the view for explaining the laser beam formed by the lighting apparatus of the example, showing a 2-dimensional intensity distribution of the laser beam in a first radiation region.
Figure 10C:
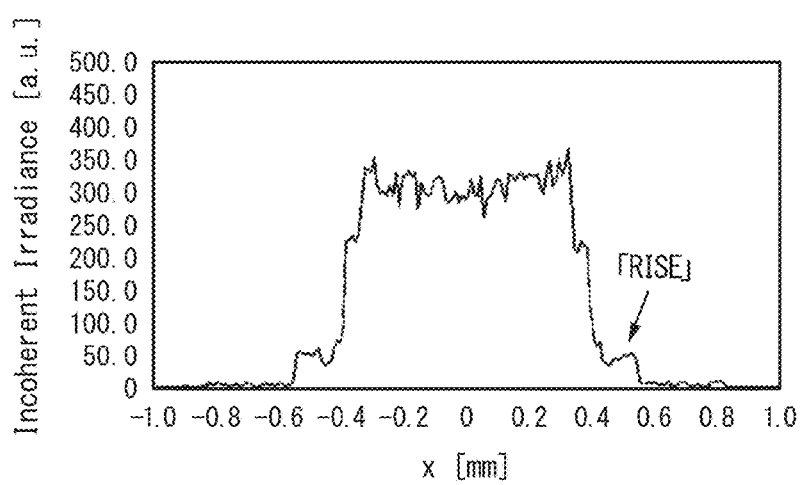
FIG. 10C is the view for explaining the laser beam formed by the lighting apparatus of the example, showing a one-dimensional intensity distribution when seen in an x-axis direction at a position of y=0 of the 2-dimensional intensity distribution in FIG. 10B.
Figure 11A:
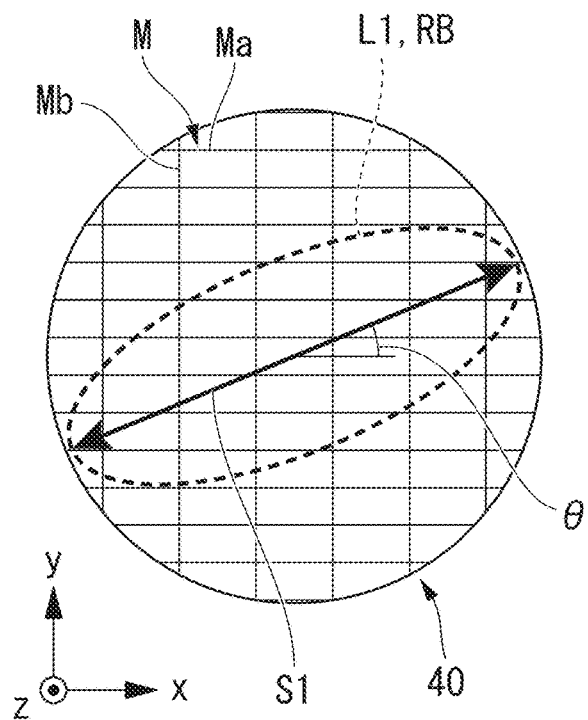
FIG. 11A is a view for explaining a laser beam formed by a lighting apparatus of an example, showing a light flux dividing section and a radiation region of a laser beam radiated to the light flux dividing section.
Figure 11B:
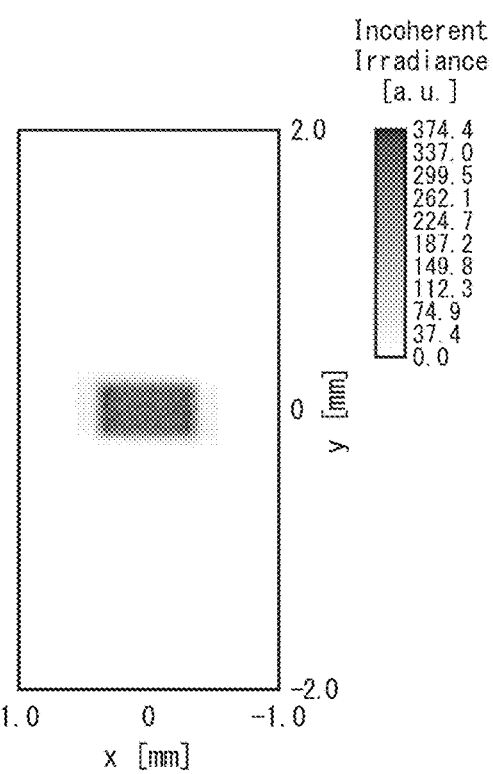
FIG. 11B is the view for explaining the laser beam formed by the lighting apparatus of the example, showing a 2-dimensional intensity distribution of the laser beam in a first radiation region.
Figure 11C:
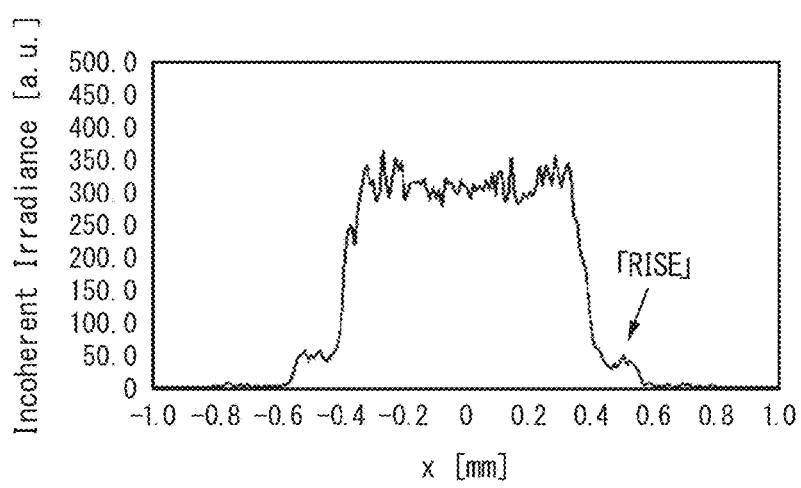
FIG. 11C is the view for explaining the laser beam formed by the lighting apparatus of the example, showing a one-dimensional intensity distribution when seen in an x-axis direction at a position of y=0 of the 2-dimensional intensity distribution in FIG. 11B.
Figure 12A:
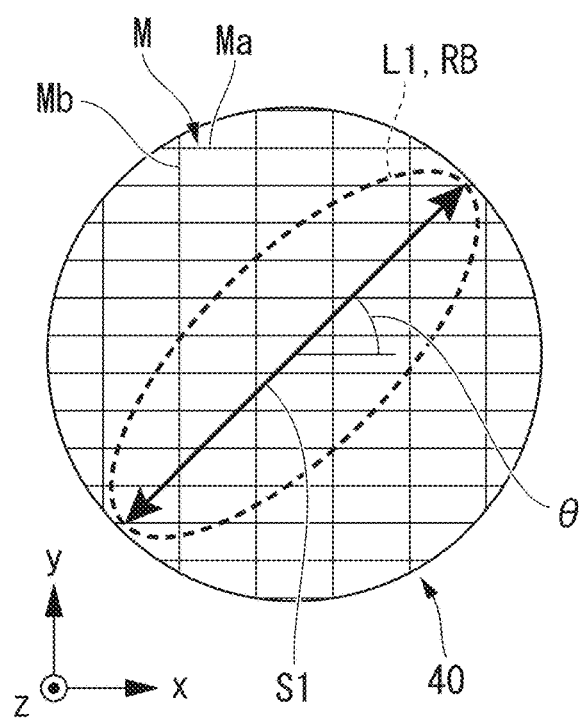
FIG. 12A is a view for explaining a laser beam formed by a lighting apparatus of an example, showing a light flux dividing section and a radiation region of a laser beam radiated to the light flux dividing section.
Figure 12B:
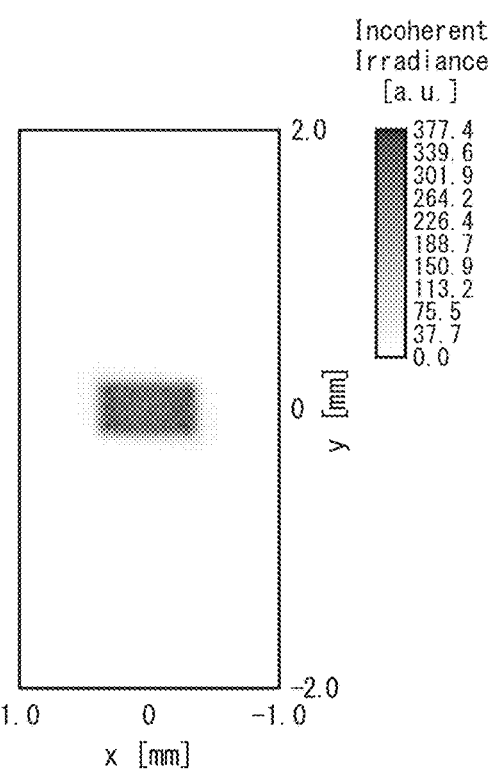
FIG. 12B is the view for explaining the laser beam formed by the lighting apparatus of the example, showing a 2-dimensional intensity distribution of the laser beam in a first radiation region.
Figure 12C:
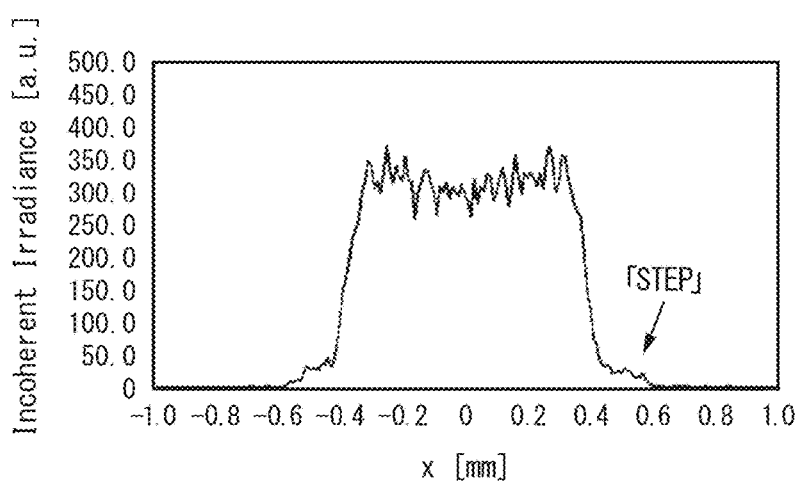
FIG. 12C is the view for explaining the laser beam formed by the lighting apparatus of the example, showing a one-dimensional intensity distribution when seen in an x-axis direction at a position of y=0 of the 2-dimensional intensity distribution in FIG. 12B.
Figure 13A:
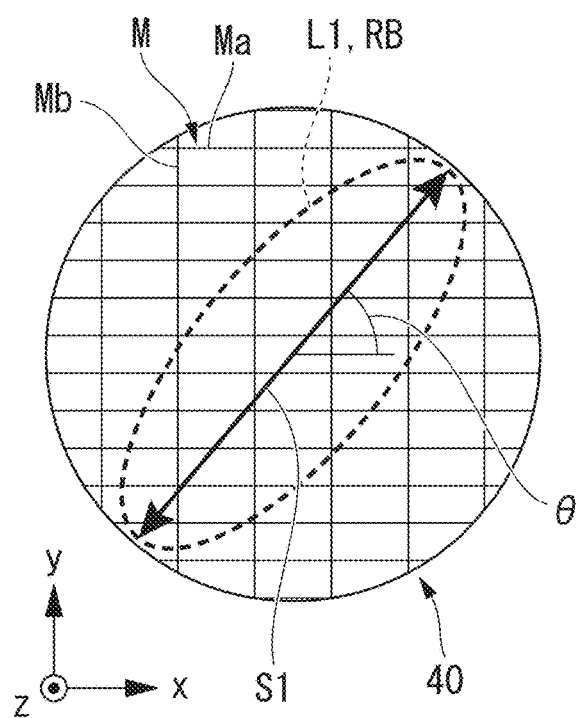
FIG. 13A is a view for explaining a laser beam formed by a lighting apparatus of an example, showing a light flux dividing section and a radiation region of a laser beam radiated to the light flux dividing section.
Figure 13B:
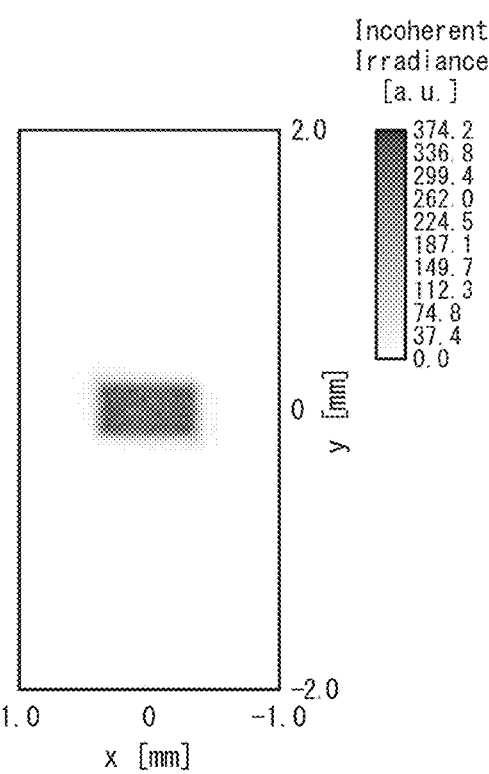
FIG. 13B is the view for explaining the laser beam formed by the lighting apparatus of the example, showing a 2-dimensional intensity distribution of the laser beam in a first radiation region.
Figure 13C:
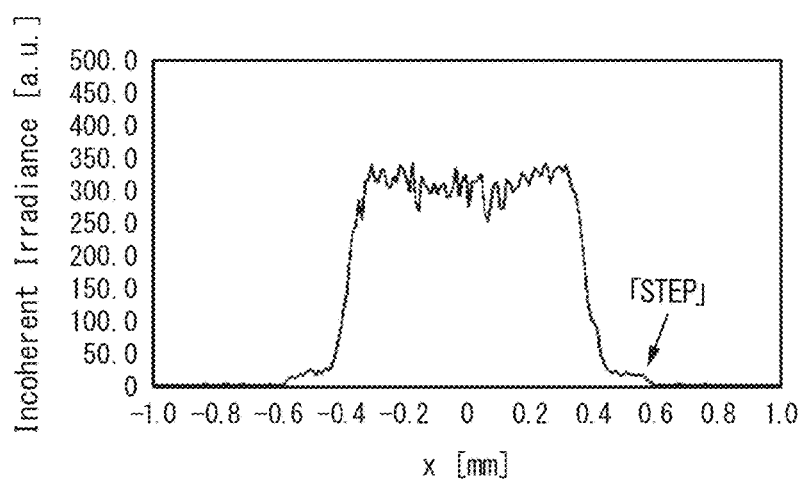
FIG. 13C is the view for explaining the laser beam formed by the lighting apparatus of the example, showing a one-dimensional intensity distribution when seen in an x-axis direction at a position of y=0 of the 2-dimensional intensity distribution in FIG. 13B.
Figure 14A:
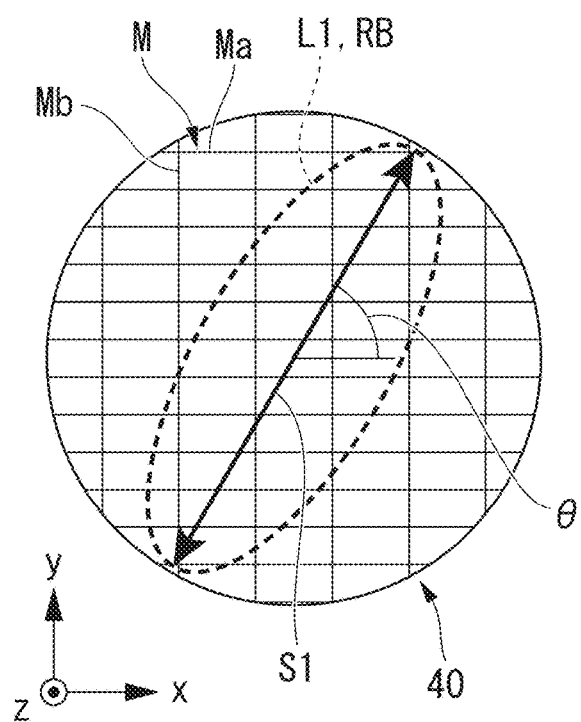
FIG. 14A is a view for explaining a laser beam formed by a lighting apparatus of an example, showing a light flux dividing section and a radiation region of a laser beam radiated to the light flux dividing section.
Figure 14B:
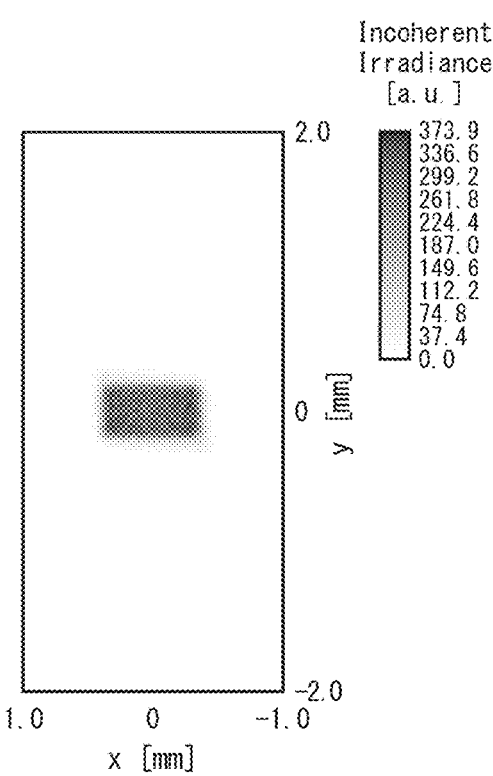
FIG. 14B is the view for explaining the laser beam formed by the lighting apparatus of the example, showing a 2-dimensional intensity distribution of the laser beam in a first radiation region.
Figure 14C:
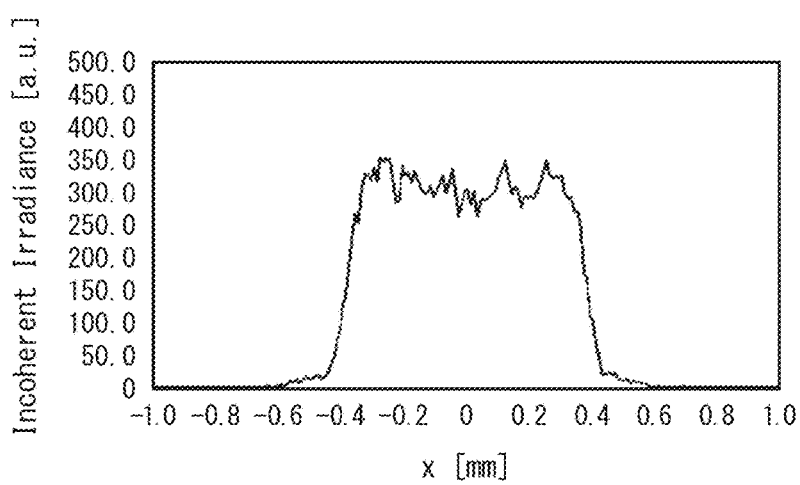
FIG. 14C is the view for explaining the laser beam formed by the lighting apparatus of the example, showing a one-dimensional intensity distribution when seen in an x-axis direction at a position of y=0 of the 2-dimensional intensity distribution in FIG. 143.

FIG. 9 is a front view of the light flux dividing section 40 when seen from a rear side in the z-axis direction, and a schematic view showing a radiation region RB and an intensity distribution of a plurality of laser beams L1 radiated to the light flux dividing section 40. In FIG. 8 and FIG. 9, among the plurality of laser sources 20 and fibers 25, the two laser sources 20A and 20B and the two fibers 25A and 25B are exemplarily shown. In the specification, when contents common to the plurality of laser sources 20 including the laser sources 20A and 20B and the fibers 25 including the fibers 25A and 25B are described, they are referred to as "the (plurality of) laser sources 20" and "the (plurality of) fibers 25."

In the second embodiment, each of the plurality of laser sources 20 has the same configuration as that of the laser source 20 described in the first embodiment. As shown in FIG. 8, end portions of the plurality of fibers 25 on the incidence side are connected to emission surfaces 20e the laser sources 20 corresponding thereto, respectively. As a result, the laser beam L1 emitted from the emission surface 20e of the laser source 20 is propagated to a core (not shown) of the fiber 25 and reaches an end portion 25b on the emission side.

As described above, in the lighting apparatus 10B, the plurality of laser sources 20 are used, the laser beam L1 emitted from the plurality of laser sources 20 by the plurality of fibers 25 can approach the light flux dividing section 40. When the plurality of laser sources 20 are used in this way, even though radiation output of each of the laser sources 20 is appropriately minimized, a quantity of light of the laser beam L1 radiated to the light flux dividing section 40 can be increased by increasing the number of the laser sources 20. As a result, a burden to each of the laser sources 20 is reduced, a failure of the lighting apparatus 10B is prevented, and the lighting apparatus 108 is expected to have a long lifetime. In addition, when the fiber 25 is used as a light guide member of the laser beam L1, the laser source 20 having a large calorific value in comparison with the component such as another optical element or the like can be installed at an arbitrary place or position separated from the other component.

The end portions 25b of the plurality of fibers 25 are disposed to be adjacent to each other in a plane including the x-axis direction and the y-axis direction. High luminance of a pseudo-excitation light source when the plurality of laser sources 20 is regarded as one pseudo-excitation light source can be achieved as a distance between the neighboring end portions 25b is closer.

The fiber 25 includes the same configuration as that of the known fiber, and includes a core and a clad provided around the core and having a refractive index lower than that of the core. A cross section perpendicular to the z-axis direction of the core and the clad has a substantially true circle. For this reason, the radiation region perpendicular to the z-axis direction of the laser beam L1 emitted from the end portions 25b of the plurality of fibers 25 on the emission side is a substantially true circle. As shown in FIG. 9, in the predetermined plane P1, for example, laser beams L1A and L1B from the two laser sources 20A and 20B are radiated to the plurality of micro lens parts M of the light flux dividing section 40. While radiation regions RB1 and RB2 when seen from the incidence side of the laser beams L1A and LIB have a substantially true circular shape as described above, intensity distributions of the laser beams L1A and LIB become a Gaussian type. A separation distance between the end portions 25b of the fibers 25A and 25B in the y-axis direction is set to a small value of about several μm to tens μm. Accordingly, the laser beam L1C in which intensities of the laser beams L1A and LIB are summed is radiated to the plurality of micro lens parts M.

Like the embodiment, when the radiation region in which the plurality of radiation regions RB1 and RB2 in the predetermined plane P1 are added has anisotropy, like the first embodiment, when seen in a front view, a narrow angle formed between the axial direction corresponding to the major axis, i.e., an arrangement direction of a radiation distribution of the laser beam L1 (an arrangement direction of the light source section 15) DR and the long side Ma of the micro lens parts M is preferably 450 or more and 90° or less, and more preferably 67.5° or more and 90° or less, and the arrangement direction DR is most preferably perpendicular to the long side Ma of the micro lens parts M. Since the arrangement direction DR is appropriately disposed with respect to the long side Ma of the micro lens parts M as described above, the laser beam having a uniform intensity distribution with small tailing is radiated to the excitation surface 60s of the fluorescent material 60 by the light flux superimposing section 50.

As described above, the lighting apparatus 10B of the second embodiment includes the plurality of laser sources 20, the plurality of fibers 25, the homogenizer optical element 30 having the light flux dividing section 40 and the light flux superimposing section 50, and the fluorescent material 60.

In the lighting apparatus 10B of the embodiment, the laser beams L1 diffused and emitted from the plurality of laser sources 20 are added and radiated to the light flux dividing section 40, and then, divided into the separate laser beams L2 having a small intensity difference between both ends on the predetermined plane P1 by the light flux dividing section 40 like the lighting apparatus 10A of the first embodiment. Since the plurality of separate laser beams L2 are superimposed on each other in the common radiation region RA using the light flux superimposing section 50, occurrence of tailing like in the related art is minimized, and the laser beam L3 having a top hat type intensity distribution is obtained. Accordingly, according to the lighting apparatus 101 of the embodiment, an optical loss from the plurality of laser sources 20 to the fluorescent material 60 is minimized, and utilization efficiency of the laser beam L1 can be increased. In addition, since the single homogenizer optical element 30 is used, a precise aligning mechanism required for the plurality of optical elements is unnecessary, and reduction in size of the lighting apparatus 10B and reduction in manufacturing costs can be achieved. In addition, according to the lighting apparatus 10B of the embodiment, the number of combinations of the laser sources 20 and the fibers 25 can be increased, high luminance of the pseudo-excitation light source can be achieved, and stronger fluorescence can be generated from the fluorescent material 60 while radiating the laser beam having a high luminance using the fluorescent material 60.

In addition, in the lighting apparatus 10A of the embodiment, when seen in a front view, a narrow angle formed between the arrangement direction of the plurality of laser beams L1 on the predetermined plane P (the arrangement direction of the plurality of laser sources 20) DR and the long side Ma of the micro lens parts M is 45° or more and 90° or less. Accordingly, like the first embodiment, laser beam L3 having a uniform intensity distribution with small tailing can be radiated to the excitation surface 60s of the fluorescent material 60 by the light flux superimposing section 50.

Further, the present invention is not particularly limited to the above-mentioned embodiments and various modifications may be made without departing from the scope of the present invention.

For example, the light flux dividing section 40 is constituted by a plurality of diffraction lenses instead of the plurality of micro lens parts M or the anomorphic lens unit. In addition, in the lighting apparatus 10B of the second embodiment, a planar lightwave circuit (PLC) having a plurality of cores may be used instead of the plurality of fibers 25. In addition, in the lighting apparatus 10B, the fiber 25 can be omitted as well as the emission surfaces 20e of the plurality of laser sources 20 can be disposed to be substantially adjacent to each other in the y-axis direction.

Hereinafter, examples and comparative examples of the present invention will be described.

EXAMPLE

An intensity distribution of the laser beam L3 (i.e., the superimposed separate laser beams L2) in the predetermined plane P2 has measured using the lighting apparatus 10A shown in FIG. 2. In the example, a radiation angle about the optical axis 20C of the laser beam L1 emitted from the emission surface 20e of the laser source 20 is set to ±20° at the major axis S and ±10° at the minor axis S2. In addition, a size of the excitation surface 60s of the fluorescent material 60 is assumed to 0.4 mm in the y-axis direction and 0.8 mm in the x-axis direction, and a target shape of an intensity distribution of the laser beam L3 in the radiation region RA was a rectangular shape of 1: 2. In addition, a distance L from the emission surface 20e to the predetermined plane P and a diameter D of the homogenizer optical element 30 were appropriately set to satisfy a relative relation of $(D/2)/L=\tan 20°$.

FIG. 10A to FIG. 16C are views for explaining intensity distribution of the laser beam L3 on the radiation region RA (see FIG. 2) when a narrow angle θ formed between the major axis S1 of the radiation region RB of the laser beam L1 on the predetermined plane P1 and the long side Ma of the micro lens parts M is changed to 0°, 22.5°, 45°, 50°, 60°, 67.5° and 90°. Further, while the intensity distribution of the laser beam L3 in the radiation region RA has been adjusted even when the narrow angle θ is also changed to an angle except the above-mentioned seven angles, results of the above-mentioned seven angles are exemplarily shown in order to easily describe effects of the present invention. FIG. 10A, FIG. 11A, FIG. 12A, FIG. 13A, FIG. 14A, FIG. 15A and FIG. 16A show radiation regions of the laser beam L1 radiated to the light flux dividing section 40 and the light flux dividing section 40, respectively, FIG. 10B, FIG. 11B, FIG. 12B, FIG. 13B, FIG. 14B, FIG. 15B and FIG. 16B show 2-dimensional intensity distributions of the laser beam L1 in the radiation region RA, respectively, and FIG. 10C, FIG. 11C, FIG. 12C, FIG. 13C, FIG. 14C, FIG. 15C and FIG. 16C show one-dimensional intensity distributions at positions of y=0 of 2-dimensional intensity distributions of FIG. 10B, FIG. 11B, FIG. 12B, FIG. 13B, FIG. 14B, FIG. 15B and FIG. 16B when they are seen in the x-axis direction.

As shown in FIG. 10A to FIG. 16B and FIG. 16C, according to the lighting apparatus 10A, it was confirmed that a top hat type laser beam L3 having a high contrast in the radiation region RA of the predetermined plane P2 is generated.

As shown in FIG. 10A, FIG. 10B, FIG. 10C and FIG. 11C, when the narrow angle θ is 0° or 22.5°, rises in intensity have occurred at both end portions of the intensity distribution of the laser beam L3. When the narrow angle θ formed between the major axis S1 of the radiation region RB of the laser beam L1 and the long side Ma of the micro lens parts M is relatively small, the intensity of the laser beam L3 is substantially uniformized within a range of x=−0.4 mm to +0.4 mm, and the intensity is abruptly reduced, when x is reduced from x=−0.4 mm and x is increased from x=+0.4 mm, then slightly increased and then reduced again. The rises at both end portions of the intensity distribution of the laser beam L3 may affect blur of the illumination light from the lighting apparatus 10A. In addition, it is conceivable the laser beam L3 of the portion of the rise cannot be easily effectively used as the illumination light of the lighting apparatus 10A.

The above-mentioned rises of both end portions of the intensity distribution of the laser beam L3 are decreased together with an increase in the narrow angle θ. As shown in FIG. 12A, FIG. 12B, FIG. 12C and FIG. 13C, when the narrow angle θ is 45° or 50°, steps in the intensity have occurred at the both end portions of the intensity distribution of the laser beam L3. That is, if the narrow angle θ formed between the major axis S1 of the radiation region RB of the laser beam L1 and the long side Ma of the micro lens parts M is 45° or more, the intensity of the laser beam L3 is abruptly reduced when x is reduced from x=−0.4 mm and x is increased from x=+0.4 mm, becomes substantially constant with no increase, and then, reduced again. Steps at the both end portions of the intensity distribution of the laser beam L3 seem to have almost no influence on blur of the illumination light from the lighting apparatus 10A. In addition, the laser beam L3 radiated to the region except the radiation region RA becomes small and appropriate.

The above-mentioned steps at the both end portions of the intensity distribution of the laser beam L3 are eliminated together with an increase in the narrow angle θ. As shown in FIG. 14A, FIG. 14B, FIG. 14C and FIG. 15C, when the narrow angle θ is 60° or 67.5°, the intensity of the laser beam L3 is abruptly reduced when x is reduced from x=−0.4 mm and x is increased from x=+0.4 mm and then slightly reduced. According to the above-mentioned laser beam L3, it seems that most of blur of the illumination light of the lighting apparatus 10A is eliminated. In addition, the laser beam L3 radiated to the region except the radiation region RA becomes small and further appropriate.

Figure 16A:
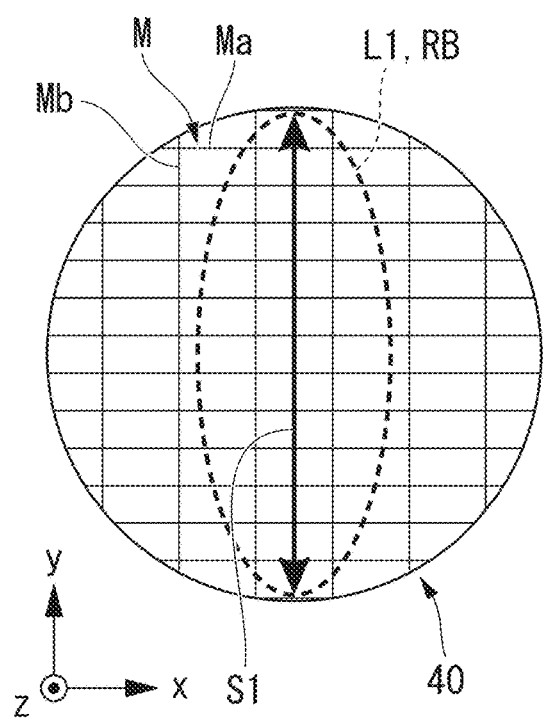
FIG. 16A is a view for explaining a laser beam formed by a lighting apparatus of an example, showing a light flux dividing section and a radiation region of a laser beam radiated to the light flux dividing section.
Figure 16B:
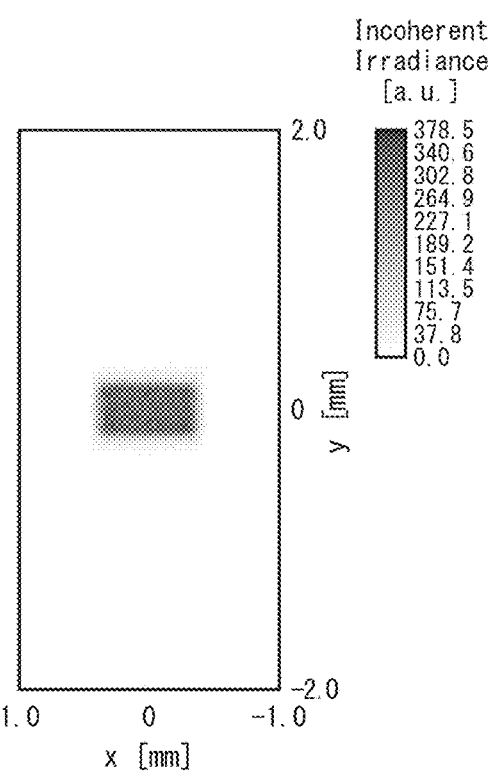
FIG. 16B is the view for explaining the laser beam formed by the lighting apparatus of the example, showing a 2-dimensional intensity distribution of the laser beam in a first radiation region.
Figure 16C:
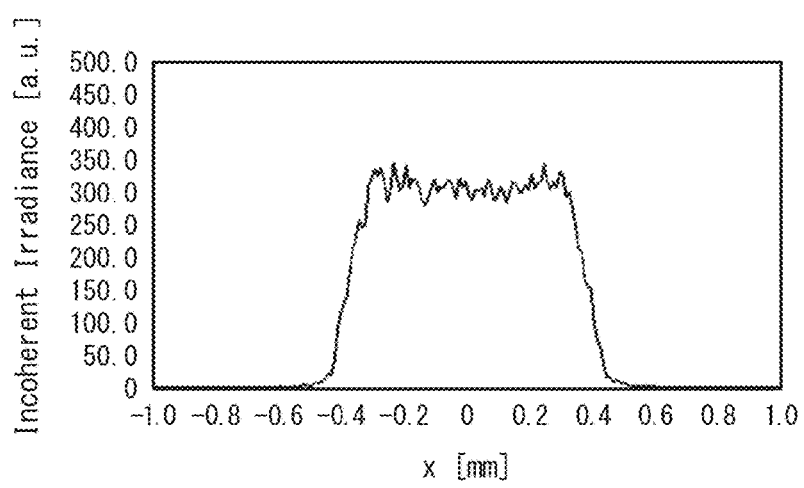
FIG. 16C is the view for explaining the laser beam formed by the lighting apparatus of the example, showing a one-dimensional intensity distribution when seen in an x-axis direction at a position of y=0 of the 2-dimensional intensity distribution in FIG. 16B.

Further, as shown in FIG. 16C, when the narrow angle θ becomes 90, an extremely appropriate top hat type laser beam L3 was obtained while the step almost does not occur at both end portions of the intensity distribution of the laser beam L3.

That is, when the major axis S1 of the radiation region RB of the laser beam L1 and the long side Ma of the micro lens parts M are perpendicular to each other, symmetry of the intensity distribution of the laser beam L3 is increased, the radiation region of the laser beam L3 has a substantially ideal rectangular shape, and the laser beam L3 can be easily used as the illumination light of the lighting apparatus 10A.

From the above-mentioned results, when seen in a front view, since the narrow angle formed between the major axis S1 of the radiation region RB of the laser beam L1 on the predetermined plane P1 and the long side Ma of the micro lens parts M is 45° or more and 90° or less, it was confirmed that the laser beam L3 having a uniform intensity distribution with small tailing is obtained in the radiation region RA by the light flux superimposing section 50.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:
1. A lighting apparatus comprising:
a light source section configured to emit a laser beam;
a homogenizer optical element that includes (i) a light flux dividing section comprising a plurality of micro lens parts, the light flux dividing section being configured to receive the laser beam from the light source section, divide the laser beam emitted from the light source section into a plurality of separate laser beams in a plane perpendicular to an optical axis of the laser beam, and make advancing directions of the plurality of separate laser beams different from each other, and (ii) a light flux superimposing section formed integrally with the light flux dividing section and superimposing the plurality of separate laser beams emitted from the light flux dividing section on each other in a common first radiation region; and
a fluorescent material excited by the plurality of separate laser beams superimposed in the first radiation region using the light flux superimposing section of the homogenizer optical element so as to emit fluorescence,
wherein:
a second radiation region perpendicular to the optical axis of the laser beam, which has been emitted from the light source section and reached the light flux dividing section, has an elliptical shape, the plurality of micro lens parts are disposed to have symmetry about at least one of a major axis and a minor axis of the elliptical shape, multiple ones of the plurality of micro lens parts are arranged within a range of each of the major axis and the minor axis of the elliptical shape, each of the micro lens parts comprises a convex lens protruding toward the light source section, an excitation surface of the fluorescent material when seen from an incidence side of the separate laser beams has a rectangular shape, each of the micro lens parts, when seen from an incidence side of the laser beam, has a rectangular shape similar to the rectangular shape of the excitation surface, and a narrow angle formed between the major axis of the elliptical shape and a long side of the respective micro lens parts, when seen from the incidence side of the laser beam, is at least 45° and at most 90°.

2. The lighting apparatus according to claim 1, wherein the shape of each of the micro lens parts when seen from the incidence side of the laser beam is similar to the shape of the excitation surface of the fluorescent material when seen from an incidence side of the separate laser beams.

3. The lighting apparatus according to claim 1, wherein the light flux superimposing section comprises a single aspherical lens part that protrudes toward the fluorescent material.

4. The lighting apparatus according to claim 1, wherein the light source section comprises a plurality of light source sections provided along a direction perpendicular to the optical axis, and each of the plurality of light source sections includes a laser source and a fiber connected to the laser source.

5. The lighting apparatus according to claim 4, wherein:

each of the micro lens parts, when seen from an incidence side of the laser beams emitted from the plurality of light source sections, has a rectangular shape similar to the rectangular shape of the excitation surface, and a narrow angle formed between an arrangement direction of the plurality of light source sections and the long side of the respective micro lens parts, when seen from the incidence side of the laser beams emitted from the plurality of light source sections, is at least 45° and at most 90°.

6. A lighting tool for a vehicle comprising the lighting apparatus according to claim 1.

7. The lighting apparatus according to claim 1, wherein:

the fluorescent material is supported by a support body which is transparent with respect to the laser beam, and a dichroic mirror is provided between the support body and the fluorescent material.

8. The lighting apparatus according to claim 1, wherein the light source section comprises one of an end surface emission type semiconductor laser, a vertical cavity surface emitting laser, and a photonic crystal surface-emitting semiconductor laser.

9. A lighting apparatus comprising:

a light source section configured to emit a laser beam;

a homogenizer optical element that includes (i) a light flux dividing section configured to receive the laser beam from the light source section, divide the laser beam emitted from the light source section into a plurality of separate laser beams in a plane perpendicular to an optical axis, and make advancing directions of the plurality of separate laser beams different from each other, and (ii) a light flux superimposing section formed integrally with the light flux dividing section and superimposing the plurality of separate laser beams emitted from the light flux dividing section on each other in a common first radiation region; and a fluorescent material excited by the plurality of separate laser beams superimposed in the first radiation region using the light flux superimposing section of the homogenizer optical element so as to emit fluorescence, wherein:

the laser beam, which has reached the light flux dividing section of the homogenizer optical element, has an elliptical shaped beam form in the plane perpendicular to the optical axis, multiple micro lens parts are arranged within the elliptical shaped beam form along each of a major axis direction and a minor axis direction of the elliptical shaped beam form, an excitation surface of the fluorescent material when seen from an incidence side of the separate laser beams has a rectangular shape, each of the multiple micro lens parts, when seen from an incidence side of the laser beam, has a rectangular shape similar to the rectangular shape of the excitation surface, and a narrow angle formed between the major axis of the elliptical shaped beam form and a long side of the respective micro lens parts, when seen from the incidence side of the laser beam, is at least 45° and at most 90°.

10. The lighting apparatus according to claim 9, wherein the light source section comprises one of an end surface emission type semiconductor laser, a vertical cavity surface emitting laser, and a photonic crystal surface-emitting semiconductor laser.

11. A vehicle lamp comprising:

the lighting apparatus according to claim 9; and an optical system configured to radiate light emitted from the fluorescent material toward a front of the vehicle.

12. The vehicle lamp according to claim 11, wherein the optical system comprises a projection lens.

13. The vehicle lamp according to claim 11, wherein:

the light flux dividing section comprises a plurality of micro lens parts, and each of the micro lens parts comprises a convex lens protruding toward the light source section.

\* \* \* \* \*